US008516366B2

(12) United States Patent
Hicks et al.

(10) Patent No.: US 8,516,366 B2
(45) Date of Patent: Aug. 20, 2013

(54) EXTENSIBLE CONTENT SERVICE FOR ATTRIBUTING USER-GENERATED CONTENT TO AUTHORED CONTENT PROVIDERS

(75) Inventors: Ryan Hicks, Seattle, WA (US); Blake Macurdy, Seattle, WA (US); Steve McQuade, Seattle, WA (US); Ben Elowitz, Seattle, WA (US)

(73) Assignee: wetpaint.com, inc., Seattle, WA (US)

( * ) Notice: Subject to any disclaimer, the term of this patent is extended or adjusted under 35 U.S.C. 154(b) by 1159 days.

(21) Appl. No.: 12/416,351

(22) Filed: Apr. 1, 2009

(65) Prior Publication Data
US 2009/0320119 A1    Dec. 24, 2009

Related U.S. Application Data

(60) Provisional application No. 61/074,568, filed on Jun. 20, 2008, provisional application No. 61/143,679, filed on Jan. 9, 2009.

(51) Int. Cl.
*G06F 17/00* (2006.01)

(52) U.S. Cl.
USPC ........................................... 715/255

(58) Field of Classification Search
USPC .............................. 715/200, 255
See application file for complete search history.

(56) References Cited

U.S. PATENT DOCUMENTS

| 5,945,989 | A * | 8/1999 | Freishtat et al. | 715/760 |
|---|---|---|---|---|
| 6,990,629 | B1 * | 1/2006 | Heaney et al. | 715/200 |
| 7,120,927 | B1 * | 10/2006 | Beyda et al. | 726/2 |
| 7,716,352 | B2 * | 5/2010 | Leetaru et al. | 709/229 |
| 7,793,214 | B2 * | 9/2010 | Koinuma | 715/234 |
| 8,341,529 | B1 * | 12/2012 | Li et al. | 715/741 |
| 8,387,006 | B1 * | 2/2013 | Taylor | 717/110 |
| 2002/0031230 | A1 * | 3/2002 | Sweet et al. | 380/278 |
| 2002/0069219 | A1 * | 6/2002 | Weng | 707/501.1 |
| 2002/0073125 | A1 * | 6/2002 | Bier | 707/530 |
| 2004/0054898 | A1 * | 3/2004 | Chao et al. | 713/168 |
| 2004/0217985 | A9 * | 11/2004 | Ries et al. | 345/740 |
| 2005/0223317 | A1 * | 10/2005 | Byrer et al. | 715/513 |
| 2005/0240657 | A1 * | 10/2005 | Yamaguchi et al. | 709/217 |
| 2005/0240869 | A1 * | 10/2005 | Leetaru et al. | 715/530 |
| 2006/0224697 | A1 * | 10/2006 | Norris | 709/218 |
| 2007/0124670 | A1 * | 5/2007 | Finck et al. | 715/526 |
| 2007/0136603 | A1 * | 6/2007 | Kuecuekyan | 713/185 |
| 2007/0289002 | A1 * | 12/2007 | van der Horst et al. | 726/9 |
| 2008/0028037 | A1 * | 1/2008 | Moyer et al. | 709/217 |
| 2008/0092060 | A1 * | 4/2008 | Berg et al. | 715/748 |

(Continued)

OTHER PUBLICATIONS

Cha et al., I Tube, You Tube, Everybody Tubes: Analyzing the World Largest User Generated Content Video System, ACM 2007, pp. 1-13.*

(Continued)

*Primary Examiner* — Cong-Lac Huynh
(74) *Attorney, Agent, or Firm* — Perkins Coie LLP

(57) ABSTRACT

A method and system allows a user to add content to a displayable content container (e.g., web page) that specifies at least one modifiable portion, where the modifiable portion is served by a server operated by one entity, but provided to the server by a service operated by another entity. The modifiable portion is attributable to the one entity and remaining content in the displayable content container is not editable by the users. Other features, such as user authentication mechanisms, are also described herein.

7 Claims, 13 Drawing Sheets

(56) References Cited

U.S. PATENT DOCUMENTS

| | | | |
|---|---|---|---|
| 2008/0141124 A1* | 6/2008 | Stavrica | 715/255 |
| 2008/0222232 A1* | 9/2008 | Allen et al. | 709/201 |
| 2008/0244740 A1 | 10/2008 | Hicks et al. | |
| 2009/0055755 A1 | 2/2009 | Hicks et al. | |
| 2009/0251724 A1* | 10/2009 | Nakajima | 358/1.15 |
| 2009/0271247 A1* | 10/2009 | Karelin et al. | 705/10 |
| 2009/0316863 A1* | 12/2009 | Fitzsimmons | 379/88.11 |
| 2009/0320117 A1* | 12/2009 | Liu et al. | 726/9 |
| 2010/0083102 A1* | 4/2010 | Jimenez et al. | 715/255 |
| 2010/0115438 A1* | 5/2010 | Chu | 715/764 |
| 2010/0306668 A1* | 12/2010 | Williams et al. | 715/741 |
| 2011/0055912 A1* | 3/2011 | Fusari et al. | 726/8 |
| 2011/0213676 A1* | 9/2011 | Singh et al. | 705/26.7 |

OTHER PUBLICATIONS

Goodchild, Citizens as Sensors: the World of Volunteered Geography, GeoJournal 2007, pp. 211-221.*

* cited by examiner

EXTENSIBLE CONTENT SERVICE FOR ATTRIBUTING USER-GENERATED CONTENT TO AUTHORED CONTENT PROVIDERS

RELATED APPLICATIONS

This application claims priority to U.S. Provisional Patent Application No. 61/074,568 entitled "CONTENT PROLIFERATION ENGINE," filed on Jun. 20, 2008, and to U.S. Provisional Patent Application No. 61/143,679 entitled "EXTENSIBLE CONTENT SERVICE FOR ATTRIBUTING USER-GENERATED CONTENT TO AUTHORED CONTENT PROVIDERS," filed on Jan. 9, 2009, which are hereby incorporated by reference.

BACKGROUND

Computer users frequently rely on search engines to identify businesses or resources satisfying the users' individual interests. For example, if a user is interested in reading about the latest celebrity gossip, the user may submit a query to a search engine that includes one or more keywords or phrases, such as the celebrity's name, the word "gossip," and so on. Typically, a search engine responds to a user query with several results (e.g., web pages), which are presented to the user in an order defined by the search engine. To be included within a search engine's search results, a web page must be accessible to the search engine. That is, the search engine must be able to discover the web page, store its address (e.g., URL), retrieve its contents (e.g., HTML data, metadata, etc.), and analyze/index the retrieved contents. After a web page has been indexed, the search engine determines whether the page will be included in a response to a particular keyword or phrase and, if so, in what order (i.e., rank) the page is presented. For example, some search engines may increase the rank of a web page when that page includes the queried keywords within the text or metadata (e.g., tags) of the page.

Users' reliance on (and habitual use of) search engines has prompted many businesses to invest resources in improving their relative ranking within search results for particular keywords or phrases associated with their business, products, targeted users, etc. Typically, by improving a website's search result rank, the user base of the website increases. Moreover, by increasing a website's user base, the website tends to generate more revenue for their business, for example, through sales, advertising, and/or investors. Indeed, businesses continue to invest an ever-increasing amount of resources in such "search engine optimization" activities. The term "search engine optimization" ("SEO") generally refers to a process of improving the position (i.e., rank) of a web page within search results that are presented to a user in response to a query containing particular keywords or phrases, thereby increasing the number of users directed to the website.

Conventional SEO strategies have centered on keyword density (e.g., including as many keywords as possible within web page titles, metadata, headers, etc.), URL character length, page size, navigation, reducing dynamic content, among others. However, algorithms for indexing and ranking search results tend to vary among search engines. Additionally, in order to prevent website operators from unfairly manipulating search results, such algorithms are generally kept secret. Moreover, search engine operators frequently update their algorithms, not only to prevent website operators from manipulating search results (such as by "keyword stuffing"), but also to improve the quality of the search results presented to its users. As a result, conventional search engine optimizations tend to be short-lived, thereby requiring more-and-more resources to be invested to develop, implement, and test new SEO strategies.

Some website operators have taken a different approach to SEO. Recognizing that search engines typically rank web pages based on their contents, some operations have focused their SEO resources on content generation to "organically" improve their rank, instead of endlessly attempting to "outsmart" the search engine. For example, such operators spend their SEO resources generating content that is "keyword dense" for particular keywords or phrases that will likely be used by potential users or users that the operator is targeting. However, content generation is expensive. For example, content generation may be prohibitively expensive (in the context of SEO activities) when a business provides a diverse array of products and/or services that may be targeted to different users segments. Moreover, generated content may become obsolete, for example, as the products and/or services offered by businesses change overtime.

Nevertheless, to facilitate content generation, a website operator may obtain a content management system ("CMS"), which is used by its developers to create web pages that are dynamically built on the fly (e.g., to include newly generated content) by inserting within such web pages queries to a database operated by the website operator. That is, website operators implement a CMS to reduce the barriers associated with publishing generated content. Examples of content management systems are provided by Interwoven Inc. of San Jose, Calif., and Vignette of Austin, Tex. Although content management systems tend reduce some costs associated with static content generation, such systems must be integrated with the operator's website and require substantial technical training and developer expertise. Also, such systems operate within an enterprise, behind the firewall of that enterprise. As a result, contribution of generated content is limited to individuals within the enterprise. Moreover, existing content management systems require the website operators to pay for content generation or risk their generated content growing stale over time.

The need exists for a system that overcomes the above problems, as well as one that provides additional benefits. Overall, the examples herein of some prior or related systems and their associated limitations are intended to be illustrative and not exclusive. Other limitations of existing or prior systems will become apparent to those of skill in the art upon reading the following Detailed Description.

BRIEF DESCRIPTION OF THE DRAWINGS

One or more examples of an extensible content service are illustrated in the accompanying drawings, in which the same reference numerals represent the same or similar elements.

DETAILED DESCRIPTION

Figure 1:
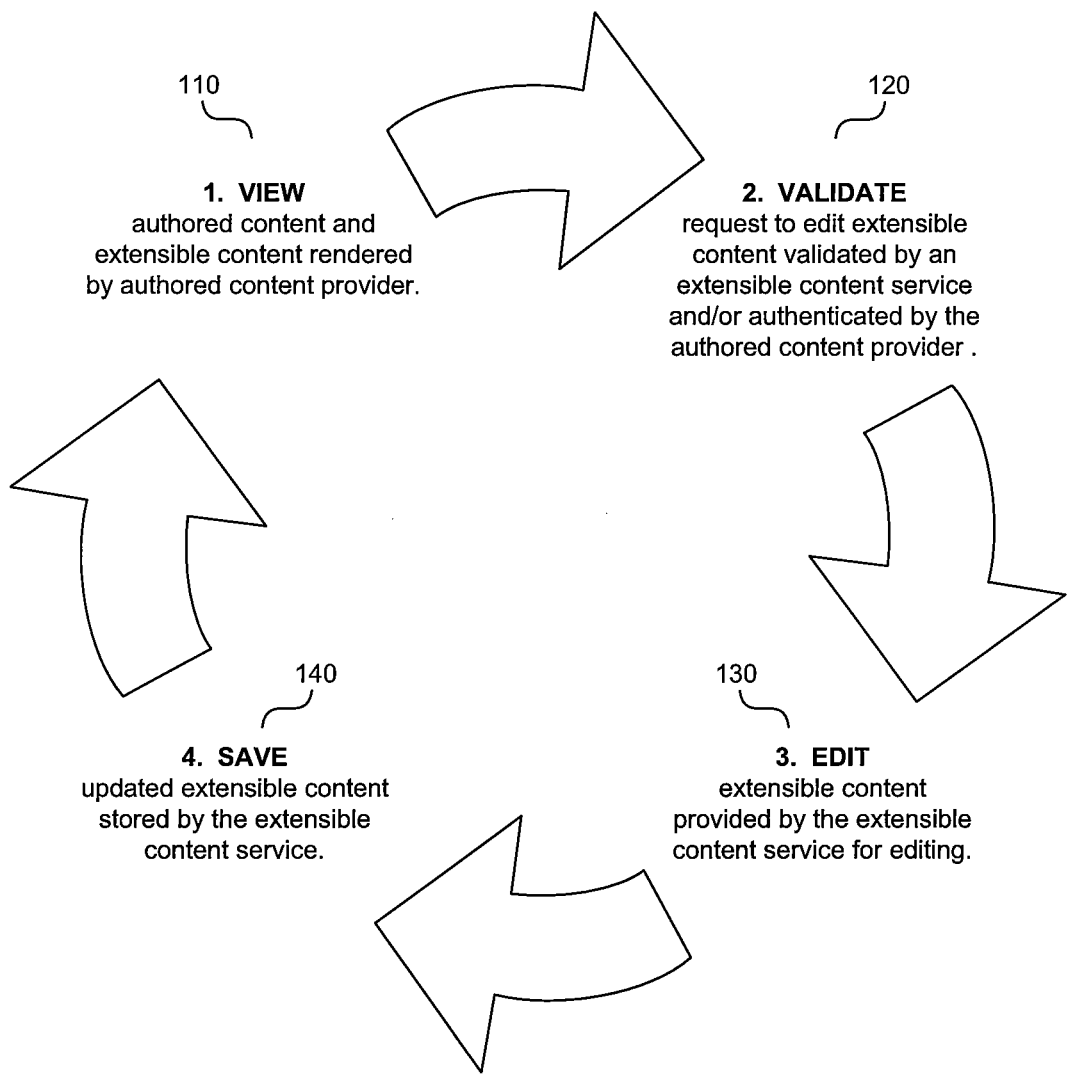
FIG. 1 is a high-level data flow diagram illustrating an example data flow of attributing user-generated content to an authored content provider through an extensible content service.

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention may include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

As discussed above, conventional SEO strategies have focused on "keyword dense" content generation and/or "outsmarting" the algorithms used by each search engines to index and rank search results. However, such optimizations are short lived, result in substantial and increasing costs to the operator, and/or require technical training and developer expertise. Accordingly, technology for attributing third-party, user-generated content to an authored content provider has been developed. The technology (sometimes referred to herein as an "extensible content service") substantially reduces the content generation costs of an authored content provider (e.g., such as a website operator) and, at the same time, stimulates a high volume of content that increases SEO benefits. That is, an extensible content service is provided to optimize content attributed to an authored content provider, including third-party, user-generated content, in order to achieve improved search engine positioning. An authored content provider may be a company that hosts one or more websites and publishes numerous pages that describe products, services, or other offerings of that company. Employees of that company, behind the company firewall, may provide content for the company's websites. More importantly, third-party users, unaffiliated with the company and located geographically remotely from the company's operations (and outside the company firewall) can provide content that may be presented side-by-side with the company's content.

As used herein, "attributable content" refers to content that may be discovered, crawled, and/or indexed by one or more search engines and appears to be owned by the authored content provider. By making user-generated content attributable to an authored content provider, the extensible content service achieves increased SEO benefit without increasing cost above traditional SEO techniques and services. That is, an authored content provider may attain SEO credit at substantially no cost to the provider (e.g., for content contributed by third-party users to a website operated by the provider). As used herein, the term "third-party user" or "user" refers to any individual computer user that may access authored content, such as a website, web services, etc., operated by an authored content provider, and who has not been specially trained to contribute content to authored content provider. Some third-party users may be "registered users" or "subscribers" of an authored content provider (e.g., the authored content provider may manage profiles associated with such users), while other users may be anonymous to the authored content provider.

The web pages noted herein may not only present information from both third-party users and authored content providers, but also receive input data, such as via a form or page with fields to be filled in, pull-down menus or entries allowing one or more of several options to be selected, buttons, sliders, hypertext links or other known user interface tools for receiving user input. While described generally herein as providing editable or extendible web pages, any displayable screen of information may be used, and the terms "screen," "web page" and "page" are generally used interchangeably herein. When implemented as web pages, the screens may be stored as display descriptions, graphical user interfaces, or other methods of depicting information on a computer screen (e.g., commands, links, fonts, colors, layout, sizes and relative positions, and the like), where the layout and information or content to be displayed on the page is stored in a database typically connected to a server. (A "link" refers to any resource locator identifying a resource on a network, such as a display description provided by an organization having a site or node on the network.) A "display description," as generally used herein, refers to any method of automatically displaying information on a computer screen in any known format.

In some embodiments or examples, an authored content provider embeds authored content together with user-generated content. User-generated content may be both contributed to an authored content provider, and made available to the provider, through an extensible content service. That is, user's may contribute content to an authored content provider via an extensible content service, and the contributed content is then made available to the authored content provider to be rendered inline by the authored content provider with other authored content, for example. The extensible content service may be used by multiple authored content providers to respond to requests for authored content, such as web pages, that include one or more portions of extensible content to which user-generated content may be, or has been, contributed. In some embodiments, an authored content provider instantiates, or permits one or more users to instantiate, multiple portions of extensible content within an authored page.

Each content portion functions independently and may include its own set of attributes and/or revision history. Users may edit an extensible content portion by selecting a control, such as an "EasyEdit" button, associated with the respective extensible content portion. For example, in edit mode, if a user selects a video for editing, the user may be presented with a menu containing multiple options for manipulating the video, such as changing the video size, location, inserting content within or overlaid on a portion of the video, and so on. As used herein, the terms "extensible content" and "user-generated content" are used interchangeably and refer to many different types of content, including, but not limited to, web page content. For example, such content may include plain text, formatted text, graphics, videos, sound files, YouTube videos, Google Calendars, maps, PhotoBucket slideshows, links to external content hosted on other servers, or any other type of content available on a network. While generally described below as "editing" a page, editing includes not only modifying an existing page, but adding or inserting to that page, deleting some or all content from that page, creating a new page or page portion, etc.

As described herein, an authored content provider, such as a business entity, authors content to be included in a first portion of a web page, which may include branding from the business entity. In some embodiments, the authored content provider designates a second portion of the web page for user-authored content. When a web page includes a second portion for user-authored content, the extensible content service permits users to add or edit content to the second portion of the web page. The first portion may be associated with a first file stored under the authored content provider, while the second portion is associated with a second, different file, stored under the extensible content service, but the first and second portions are displayable on a user computer concurrently by the authored content provider via the single editable web page. The term "file" represents any data container that may be written to disk via a server, stored in memory, as well as any addressable location where data may be stored. Often, the file or content container includes tags, instructions, or otherwise defines a displayable content that may be displayed by a user computer.

The extensible content service may centrally manage content contributed by third-party users to multiple authored content providers. Typically, the extensible content service is not under common ownership with, or controlled by, an operator of at least one authored content provider for which the extensible content service manages user-generated content. Similarly, some authored content providers may be under common ownership, and controlled by, a single operator, while other authored content providers are not under common ownership, or controlled by, an operator of any other authored content provider.

The extensible content service may provide an application programming interface (API), sometimes referred to herein as a "data access API," through which authored content providers retrieve extensible content and/or introduce a client application within an authored page before an assembled page is provided to the requesting user. The client application may provide client-side APIs that allow third-party users to access social publishing features of the extensible content service within an authored page. As used herein, the term API may refer to a collection of functions or a single function within a collection.

The data access API provides a function for authored content providers to designate one or more locations within an authored page as "extensible" or "editable" portions to which third-party users may contribute and/or edit content. As used herein, the terms "edit", "editing," "editable," etc. refer to any organic content creation by third-party users, such as by adding or inserting new user-generated content, modifying or deleting existing user-generated content, and so on. For example, an authored content provider may designate a location as extensible by including a server-side include ("SSI") statement at that location.

When the authored page is requested, a SSI statement retrieves a client application that provides one or more client-side controls. For example, the client application includes an "EasyEdit" button that a user selects to contribute content to the designated location. In some embodiments, when a user selects a client-side control, such as the EasyEdit button, the client application generates a request that is sent to the extensible content service for an editable version of the content. For example, users may add images to an extensible content portion, such as by uploading an image from the user's computer, entering an image URL, searching and selecting an image from a web-based image repository (e.g., Yahoo's image repository), and so on. The client application may also provide client-side controls for manipulating such user-contributed images, for example by authoring an image caption, adding image links, defining image alignment, text wrapping, sizing, and so on. As another example, users may add widgets to an extensible content portion, for example, by including the widget URL, embedded widget code, searching and selecting a widget from a web-based widget repository, and so on. Such widgets may include YouTube Video, Google Video, Vizu Polls, RSS Feeds, Google Calendar, Photobucket Slideshow, Imeem, ZeeMaps Map, Meebo Messaging, Gabbly Chat, or other widgets, for example with embedded or Iframe output code. The client application may also provide client-side controls for manipulating such widgets, for example, defining widget alignment, text wrapping, sizing, preview, and so on. As yet another example, in some embodiments, users may add, edit, or remove keyword tags used to describe a portion of extensible content. Keyword tags aid in content discovery and increase search and SEO benefits of the user-generated content.

In some embodiments, to contribute content to an authored content provider, the extensible content service provides a client-side API through which third-party users may access one or more social publishing components within an authored page, such as a WYSIWYG ("What You See Is What You Get") editor. A WYSIWYG editor may be provided to translate graphically entered formatting instructions, such as "bold" and "italics," into corresponding source code tags. That is, a WYSIWYG editor may be used to transparently generate the markup of user-contributed content, thereby shielding the user from the technical details. In some embodiments, user-generated content inherits the style (e.g., "look and feel") of the provider's authored content, such as a background color, font color, font type, font size, link colors, and so on, thereby providing a consistent user experience to third-party users. In other embodiments, or within certain authored pages, an authored content provider may specify a particular style for user generated content that is different from the authored content.

The client-side API may be accessed using RESTful ("Representational State Transfer") commands to programmatically create, retrieve, update, or delete user-generated content. REST is an architecture style that describes how resources (such as portions of extensible content) are defined or addressed. In some embodiments, a user-generated content ("UGC") identifier and namespace of an authored content provider are used to address a portion of extensible content to which user-generated content may be, or has been, contributed. Using RESTful commands, computing systems (such as, e.g., clients and servers) may exchange representations of one or more resources, each typically identified by a unique identifier. That is, each computing system may interact with a resource by requesting that a particular action be performed and by providing the resource identifier.

The response from a RESTful command may be provided to the requester (e.g., user application, authored content provider) in a normalized or standardized format (such as, e.g., an XML format). That is, the user-generated content may be normalized such that it does not reference any particular application format (e.g., a browser format, such as those formats preferred by Mozilla Firefox, Microsoft Internet Explorer, Apple Safari, and so on). In some embodiments, when the user requests to edit a portion of extensible content, the content is translated from the normalized format into the application's preferred format. A technique suitable for this purpose, is described in commonly-owned, co-pending U.S. patent application Ser. No. 12/043,718 of R. Hicks et al., filed on Mar. 6, 2008 and entitled, "BROWSER-INDEPENDENT EDITING OF CONTENT", which is hereby incorporated by reference. In some embodiments, if a user copies content from a format not supported by a particular authored content provider (e.g., Word), the extensible content service reformats the user-generated content to satisfy requirements specified by the authored content provider.

In some embodiments or examples, user-generated content contributed to an authored page is retrieved by the authored content provider as embedded content (such as, e.g., HTML) via a server-side include ("SSI"). That is, SSI statements may be used to identify editable content managed by the extensible content service, which is to be rendered inline with authored content by the authored content provider. For example, when a SSI statement is encountered by a web server responding to a request for authored content, the extensible content (if any) referenced by the statement is incorporated as part of the authored content rendered by the web server. The requesting user may be anonymous to the authored content provider. Typically, requests received from a search engine are anonymous (e.g., when a website is crawled by a search engine). Data Access APIs may be used to dynamically add user-generated content to existing authored pages, without having to serve the entire page or user-generated content via a Java applet, JavaScript, AJAX, Flash movie, or other dynamic technology that cannot be discovered, crawled, and indexed by a search engine.

As a result, content contributed by users to an authored content provider through the extensible content service, is rendered attributable to the authored content provider. That is, the extensible content service enables the user-generated content to be discovered, crawled, and indexed by search engines, thereby increasing SEO benefits enjoyed by authored content providers to which the content was contributed. Moreover, the extensible content service reduces the costs of generating content because user-generated content is attributable to the authored content provider, as if it were actually generated by the provider, at substantially no cost to the provider. Furthermore, user-generated content has the opportunity to remain fresh due to constant user interaction. Thus, the SEO benefits realized from user-generated content are less likely to become stale, particularly as more-and-more user-generated content is contributed. User-generated content may further provide a viral effect, in that, as users contribute content to the authored content provider, the authored content provider receives more-and-more SEO benefits, thereby attracting more-and-more users who contribute more-and-more content, and so on.

In some embodiments, the data access API provides a function through which an authored content provider may enable third-party users to add pages to a website operated by the provider. For example, an authored content provider may include a SSI statement within an authored "parent" page to enable users to add user-generated pages that are navigable from the authored parent page. When the authored page is requested, the SSI statements are used to retrieve client-side controls, such as an "AddPage" button. In some embodiments, when a user selects the AddPage button, the client application generates a request that is sent to the extensible content service for a new page attributable to the authored content provider. An added page may be automatically generated to include one or more portions of extensible content to which user-generated content may be contributed. In some embodiments, the added pages include a particular layout, style, navigation, branding, and/or other authored content specified by the authored content provider. For example, a user-generated page may provide the same functionality provided by an authored page, including user authentication, client-side application, editing of user-generated content, add user-generated pages, and so on. Added pages created by users point or relate to new URLs within the authored content, which can then be found by other users, including search engines. User-generated pages are attributed to the authored content provider, thereby increasing the footprint of the authored content provider, reducing the costs associated with content generation, and increasing the search engine optimization of the provider.

In some embodiments, the extensible content service enables user-generated content to be shared between two or more authored content providers. For example, the extensible content service may provide a client-side application that includes a control to generate or return a reference to the shareable content (e.g., UGC identifier, a URL, inline frame (iframe) tag, embed tag, semantic link, java script, etc.) that may be used to add the content to another web page. As a result, user-generated content may be presented to a user by a content provider other than the authored content provider to which the user-generated content was originally contributed. That is, because user-generated content is stored external to, and independent of, the authored content provider to which the content was originally contributed, it may be requested from the extensible content service by any content provider or user (e.g., by referencing the UGC identifier). In one example, a user visits a "Madonna gossip" web page of an authored content provider that includes an editable portion for user-generated content. To facilitate description, it is assumed that the editable portion of the web page is shareable. Using the extensible content service, the user edits the editable portion of the web page to include a list of rumored concert dates and venues for an upcoming Madonna tour. Continuing with the current example, another user subsequently visits the "Madonna gossip" web page and selects the control to include the portion of user-generated content on another web page. For example, the other user may be an avid Madonna follower that maintains a personal blog about Madonna. As another example, the other user may frequently visit a different authored content provider to review the latest Madonna news and desire to have the list of concert dates and venues viewable from that authored content provider's web site. It is noted that the subsequent user need not be another user. For example, the subsequent user may be the user that originally contributed the user-generated content to the editable portion of the Madonna Gossip web page. Returning to the current example, in response to the selection of the control, the extensible content service generates or returns a reference to the content. For example, the extensible content service may generate an iframe that the other user copies and pastes into the source code of their personal blog, such as: <iframe src="http://www.extensibleContentService.com/getUGC.do?ns=foo&id=someid" </iframe>. As another example, the extensible content service may return a UGC identifier. In some embodiments, the client-side application may include a control that accepts UGC identifiers as a way to add user-generated content to an editable web page. Continuing with the current example, if a user then changes a concert date or venue on the list via the extensible content service, that change is automatically reflected in both the Madonna Gossip web page and any other web page with which the content is shared. In some embodiments, when a user requests to edit user-generated content that is presented by a content provider other than the authored content provider to which the content was originally contributed, the extensible content service directs the user to sign-on using an authentication interface provided by the authored content provider to which the content was originally contributed. While in other embodiments, the extensible content provider directs the user to sign-on using an authentication interface provided by the content provider presenting the shared content.

In some embodiments, the extensible content service allows an authored content provider to specify whether its originally-contributed user-generated content may be shared and on what basis. For example, an authored content provider may specify that its entire body of originally-contributed user-generated content is shareable. As another example, an authored content provider may specify that particular pages are shareable. As yet another example, an authored content provider may specify particular portions of a page that are shareable. In some embodiments, an authored content provider may further specify whether its shared user-generated content, if any, may be attributed to other authored content providers.

In some embodiments, when user-contributed content is presented to a user by a content provider other than the authored content provider to which the content was originally contributed, the extensible content service specifies that the shared content is to be provided with a reference to the authored content provider to which the shared content was originally contributed (e.g., a link to the page at which the content was originally contributed to the authored content provider). For example, the reference may be included in the source code of the web page that presents the shared content. It is noted that the reference may or may not be visible to the user. It is further noted that the reference may be specified by the extensible content provider at the time the content is shared or at the time the shared content is requested by the content provider or user computer. By including a reference back to the originating authored content provider, the extensible content service increases the likelihood that such user-generated content will be discovered, crawled, and indexed by search engines without sacrificing its uniqueness. However, in some embodiments, shared user-generated content is attributable to multiple authored content providers.

In one example, a user creates a list of concert dates for a band. The user creates that list for one web page for a website controlled by an authored content provider, via the extensible content service that exists at a central location. The user may likewise include that list for another web page associated with another authored content provider (or another website controlled by the first authored content provider). If the user then changes a concert date or venue on the list, that change is made via the (central) extensible content service, and the change is automatically reflected in both web pages.

In some embodiments, before a third-party user may contribute content to an authored content provider, the extensible content service determines whether the user has been authenticated by the authored content provider. For example, when a user requests to edit content, the extensible content service may determine whether the user's request includes a token and, if so, whether the token is valid. If the request includes a valid token, the extensible content service returns an editable version of the requested portion of extensible content to the user. Otherwise, if the request does not include a token, or includes an invalid token, the extensible content service may direct the user to sign-on using an authentication interface provided by the authored content provider to which the user desires to contribute content. In some embodiments, the client application is used to direct the user (via a client-side API) to the authentication interface provided by the authored content provider. By directing the user via the client application to the authentication interface of the authored content provider, the user's authentication to the extensible content service is transparent to the user. That is, the extensible content service trusts the authentication process provided by the authored content provider and does not require the user to log into both the extensible content service and the authored content provider to contribute content. Details regarding user authentication are known and well documented, and thus need not be described in detail in order to gain an understanding of the concepts and operation of the technology introduced herein.

Authentication of a user by the extensible content service is transparent to the user because a user may not be required to sign-on to both the authored content provider and the extensible content service in order to contribute content to the provider through the extensible content service. Instead, the extensible content service trusts the authentication process provided by the authored content provider.

When a user is directed to the authentication interface of the authored content provider, the user may submit his or her credentials (e.g., username, password, pin, etc.) to the authored content provider. In some embodiments, when the user is authenticated, the authored content provider generates a token that is provided to the authenticated user and the extensible content service. In other embodiments, the authored content provider notifies the extensible content service of the user's authentication and, in response to the notification, the extensible content service generates a token corresponding to the authenticated user. A generated token may be a key or data structure that is used to identify the authenticated user and/or a permission level associated with the user, such as editor, moderator, and so on. In some embodiments, a token is valid for a predetermined or specified period of time, such as 24 hours or less. No special permissions may be necessary to view content. That is, unlike requests to contribute content, requests to retrieve extensible content may be made anonymously (i.e., do not require a token).

FIG. 1 is a high-level data flow diagram illustrating an example data flow of attributing user-generated content to an authored page through an extensible content service. As used herein, "attributable content" refers to content that may be discovered, crawled, and/or indexed by one or more search engines and appears to be owned by the authored content provider. By making user-generated content attributable to an authored content provider, the extensible content service achieves increased SEO benefit without increasing cost above traditional SEO techniques and services. That is, an authored content provider may attain SEO credit at substantially no cost to the provider (e.g., for content contributed by third-party users to a website operated by the provider). Some authored pages may not include extensible content or client-side controls for embedding user-generated content. That is, authored content providers may select authored pages that are suitable for and/or more likely to attract users to contribute content. However, in the illustrated example, to facilitate description, it is assumed that an authored page includes at least one portion of editable content and/or client-side controls for contributing user-generated content to the authored page.

In step 110 of the illustrated example, when an authored content provider receives a request from a user for an authored paged, the provider renders the authored content and any portions of extensible content (e.g., user-generated content) to the requester in a viewable state. For example, the authored web page may include an extensible portion specifying a video stored at another website (such as, e.g., YouTube). In a viewable state, the requesting user typically cannot contribute content to an extensible portion of the authored page. The viewable state of the page is the state in which the search engines access the page.

In some embodiments, the authored page includes an editing interface. For example, the interface may provide an "EasyEdit" button that, when selected by a user, generates a request for an editable version of the extensible content. In step 120 of the illustrated example, when a user requests an editable version of the extensible content rendered by the authored content provider, the extensible content service determines whether the user's request includes a token and, if so, whether the token is valid. If the request does not include a token, or includes an invalid token, then, in step 120, the extensible content service directs the user to sign-on using the authentication interface provided by the authored content provider. The extensible content service's direction of the user to an authentication interface of the authored content provider may be transparent to the user. That is, the extensible content service trusts the authentication process provided by the authored content provider and does not require the user to log into both the extensible content service and the authored content provider to contribute content. Otherwise, if the request includes a valid token, the extensible content service returns an editable version of the extensible content to the user in step 130.

The extensible content service may provide a WYSIWYG ("What You See Is What You Get") editing environment for modifying editable portions of extensible content that are displayed together with authored content. The WYSIWYG editing experience may include text editing, formatting, spell check, controls to provide links to or embed images, rich media, widgets, etc. The extensible content service is not limited to text-based user-generated content. For example, the extensible content service may be used to edit various types of content, including, but not limited to, text, images, audio, video, RSS feeds, widgets, and so on. As such, examples of text-based user-generated content should not be taken as restrictive. In some embodiments, when a portion of the extensible content includes non-editable content, the extensible content system translates that portion into an editable placeholder and indicates the editable attributes of that portion of the extensible content represented by the placeholder. A technique for which is suitable for this purpose, is described in commonly-owned, co-pending U.S. patent application Ser. No. 11/842,786 of A. Berg et al., filed on Aug. 21, 2007 and entitled, "REPRESENTING EDITABLE ATTRIBUTES OF EMBEDDED CONTENT", which is hereby incorporated by reference.

In step 140 of FIG. 1, in response to a request to store edits to a portion of extensible content, the extensible content service stores any modifications to the content, thereby preparing the content for viewing (e.g., retrieval by the authored content provider) in response to a request from that user or another user. Those skilled in the art will appreciate that the steps shown in FIG. 1 may be altered in a variety of ways. For example, the order of certain steps may be rearranged; certain steps may be performed in parallel; certain steps may be merged or divided; certain shown steps may be omitted; other steps may be added; and so on.

Figure 2:
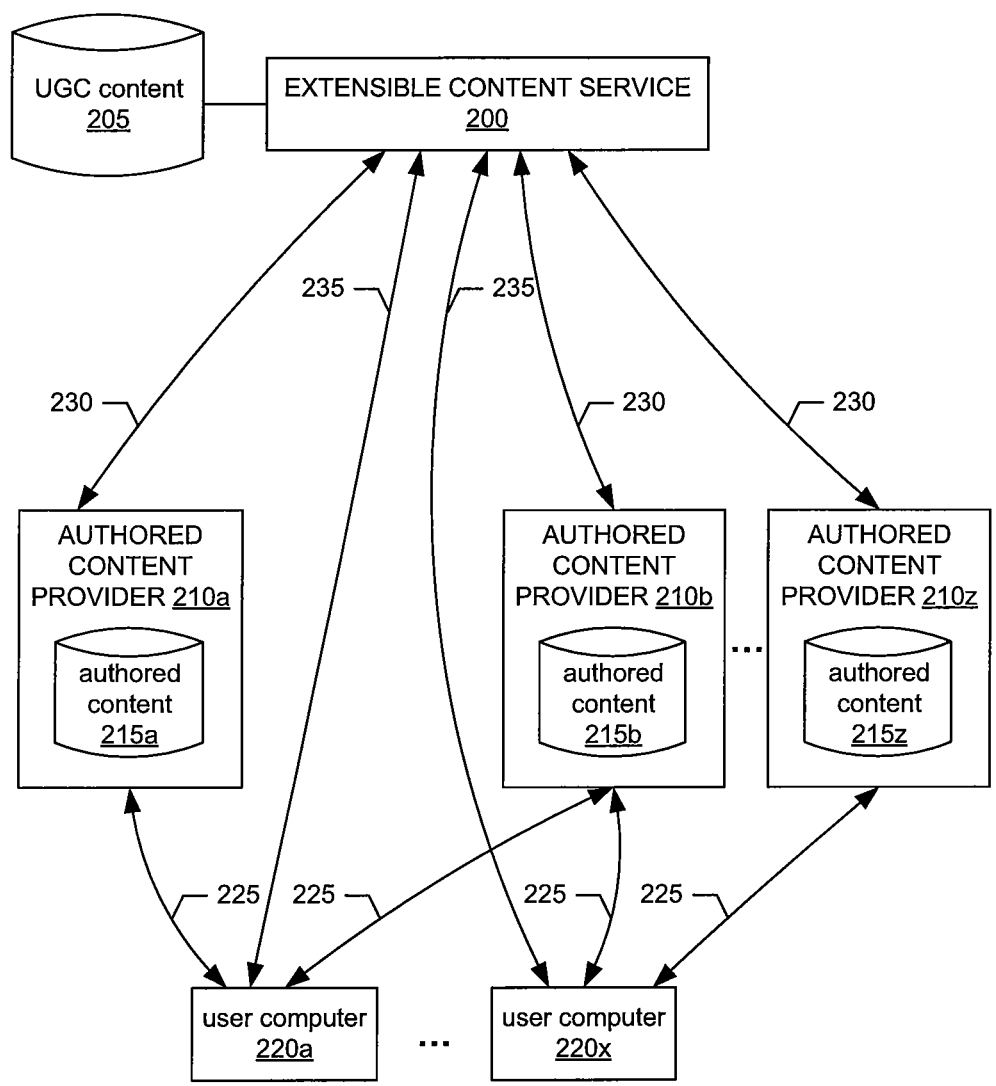
FIG. 2 is a high-level block diagram illustrating an example of an extensible content service for attributing user-generated content to multiple authored content providers.

Before describing the extensible content service in greater detail, it is useful to consider an environment in which the extensible content service can be implemented. FIG. 2 is a high-level block diagram illustrating an extensible content service 200 for attributing user-generated content to multiple authored content providers 210 in one or more embodiments. Those skilled in the art will appreciate that certain well-known structures and functions have not been shown or described in detail to avoid obscuring the description.

In the illustrated example, an extensible content service 200 includes a storage subsystem 205 that stores user-generated content ("UGC") attributable to multiple authored content providers 210$a,b, \ldots, z$. The extensible content service may be implemented by one or more block-based servers (e.g., used in a Storage Area Network ("SAN") mode), file-based servers (e.g., used in a Network Attached Storage (NAS) mode), or a combination of server types. The UGC storage subsystem 205 may be, for example, magnetic disks, optical disks, magneto-optical (MO) storage, or any other type of non-volatile storage devices suitable for storing large quantities of data. In some embodiments, the UCG storage subsystem 205 is organized as a Redundant Array of Inexpensive Disks (RAID), in which case the extensible content service 200 accesses the UCG storage subsystem 205 using one or more well-known RAID protocols. Of course, while certain data storage devices or systems are described herein, any other data storage environment may be used.

The Extensible content service 200 is also connected or coupled to multiple authored content providers 210$a, b, \ldots, z$ and multiple user computers 220$a \ldots x$ through a network, such as the Internet. User computers 220$a \ldots x$ may be, for example, personal computers, search engines, Internet appliances, mobile or hand-held wireless devices, programmable or embedded consumer electronics, set-top boxes, and so on. Each authored content provider 210 may be implemented as one or more block-based servers (e.g., used in a SAN mode), file-based servers (e.g., used in a NAS mode), or a combination of server types. Each authored content providers 210 may include one or more storage subsystems 215 that store authored content generated by the authored content provider. The authored content storage subsystems 215 may be, for example, magnetic disks, optical disks, magneto-optical (MO) storage, or any other type of non-volatile storage devices suitable for storing large quantities of data. In some embodiments, the authored content storage subsystems 215 are organized as a Redundant Array of Inexpensive Disks (RAID), in which case each authored content providers 210 accesses its corresponding storage subsystem(s) 215 using one or more well-known RAID protocols.

In the illustrated example, each authored content providers 210 receive and respond to various requests from user computers 220, such as, requests for authored content attributable to the authored content provider 210. For example, the authored content provider 210 may receive a "retrieval" request 225 from the user computer 220 to view an authored page that includes user-generated content. In response to the retrieval request, the authored content provider 210 generates a corresponding "retrieval" response 225 that renders the authored content together with the user-generated content in a viewable state. This may be accomplished, for example, by the authored content provider 210 generating a "retrieval" request 230 to retrieve user-generated content (e.g., content corresponding to a specified UGC identifier) from the extensible content service 200. In response to the retrieval request, the extensible content service 200 retrieves the specified user-generated content and generates a corresponding "retrieval" response 230 that provides the user-generated content to the authored content provider 210. The requested authored content provider 210 provides to the requesting user computer 220 retrieval responses 225 for authored content that include user-generated content as a single page. That is, in the SEO context, the page is perceived by each requesting user computer 220 as whole and attributable to the authored content provider 210.

In some embodiments, the extensible content service 200 may respond to a retrieval request 230 with both the requested user-generated content and one or more client-side controls, such as an EasyEdit button, and AddPage button, and/or other controls, that may be selected by a user to contribute content attributable to the authored content provider 210. The authored content provider may then render the client-side controls together with the viewable content (e.g., authored content and user-generated content).

If a user selects a client-side control, for example the EasyEdit button, the user computer 220 generates an "edit" request 235 to the extensible content service 200 to retrieve an editable version of the user-generated content. Requests 235 to contribute content typically include a token that is used by the extensible content service 200 to identify the user and/or determine whether the user computer 220 is authorized to contribute content as requested. In some embodiments, when a request 235 does not include a token, or includes an invalid token, the extensible content service 200 directs the user computer 220 to an authentication interface provided by the authored content provider 210. For example, the authored content provider 210 may receive an "authentication" request 225 from user computer 220 to sign-on using the provider's authentication interface. In some embodiments, once the requesting user computer 220 is authenticated, the authored content provider 210 generates a corresponding "authentication" response 225 providing the user computer 220 with a token. In alternative embodiments, the authored content provider 210 generates a "token" request 230 indicating to the extensible content service 200 that the user computer 220 has been authenticated and requesting that the extensible content service generate a token corresponding to the authenticated user. In response to receiving a token request, the extensible content service 200 may generate a corresponding "token" response 230, which includes a token provided to the user computer 220 by the authored content provider 210 in the provider's corresponding authentication response 225.

In some embodiments, after a user computer 220 has been authenticated by an authored content provider 210, the user may contribute content attributable to the authored content provider 210, such as by editing user-generated content or adding user-generated pages. For example, continuing with the example above, when an edit request 235 includes a valid token, the extensible content service 200 generates a corresponding "edit" response 235 that returns an editable version of the requested user-generated content to the requesting user computer 220. The editable version of the user-generated content may be presented to the user in a WYSIWYG or other suitable editor.

In some embodiments, the editor includes a client-side control that, when selected by the user, the user computer 220 generates a "save" request 235 to the extensible content service 200 to save the user's edits or contributions to the user-generated content. The extensible content service 200 stores any edits to the user-generated content, thereby preparing the content for viewing (e.g., retrieval by the authored content provider 210) in response to a request from that user computer 220 or another user computer 220. In some embodiments, two or more users may edit the same or different versions of extensible content. For example, while a first user is editing a particular portion of extensible content, a second user may edit (and save) that particular portion of extensible content. In such embodiments, the extensible content system 200 may provide an interface (e.g., via the client application API) to notify the first user that multiple versions of the extensible content exist (e.g., user's edited version, the version prior to the second users edits, the version resulting from the second user's edits, etc.). In some embodiments, the user may choose to merge the versions, override the second user's edits, or not save their changes at all.

While various embodiments and examples are described in terms of the environment described above, those skilled in the art will appreciate that the extensible content service 200 may be implemented in a variety of other environments, as well as various other combinations of computing systems, or similar devices connected in various ways. For example, in some embodiments, the extensible content service 200 has a distributed architecture, even though it is not illustrated as such in FIG. 2. As another example, in some embodiments, the extensible content service 200 can be adapted for use in other types of storage systems that provide authored content providers 210 and/or user computers 220 with access to extensible content, or processing systems other than storage servers.

Figure 3:
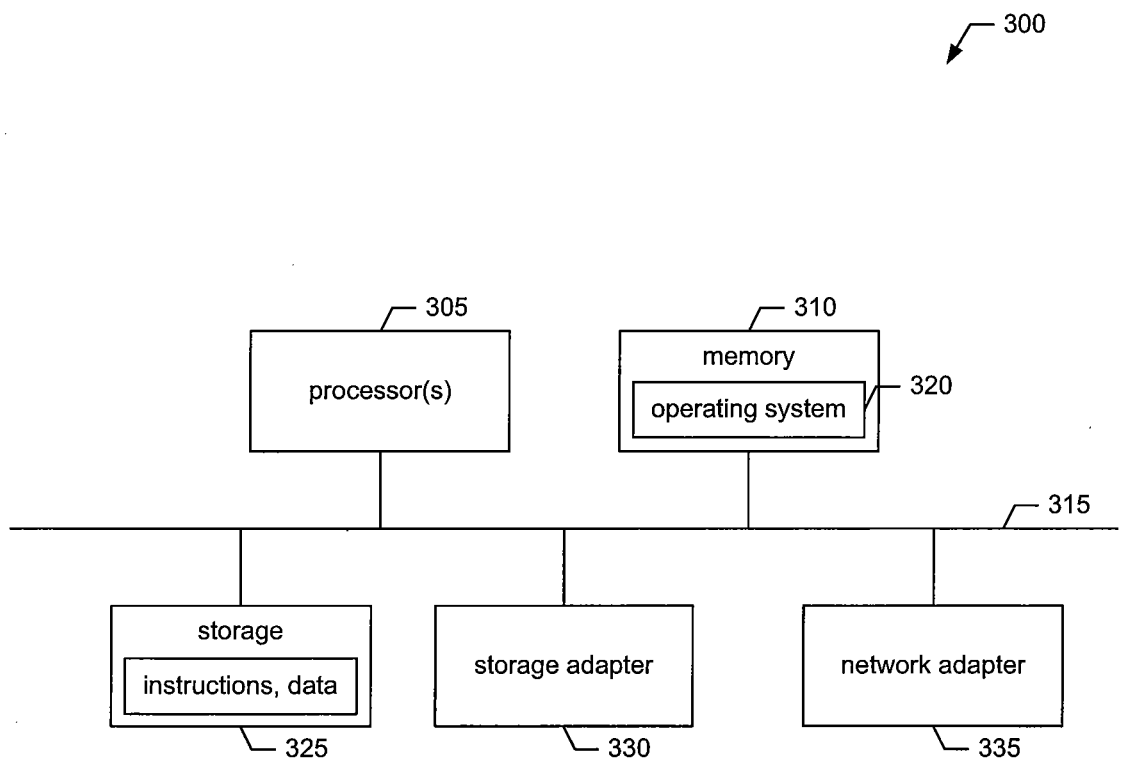
FIG. 3 is a high-level block diagram illustrating an example architecture of a computing system that may be used to implement an extensible content service.

FIG. 3 is a high-level block diagram illustrating an example architecture of a computing system 300 that may be used to implement an extensible content service 200 in one or more embodiments. Those skilled in the art will appreciate that certain well-known structures and functions have not been shown or described in detail to avoid obscuring the description.

In the illustrated example, the extensible content service 200 is implemented by a computing system 300, such as a web server, that includes one or more processors 305 and memory 310 coupled to an interconnect system 315. The processors 305 are the central processing units ("CPUs") of the computing system 300 and, thus, control its overall operation. The processors 305 accomplish this by executing software stored in memory 310. In some embodiments, the computing system 300 includes a processor 305 having two or more independent cores in a package composed of a single integrated circuit (referred to as a "die"), one or more dies packaged together, multiple packages, and so on. In some embodiments, the computing system 300 includes a hyper-threaded processor 305 that, despite having only a single core, is capable of performing as a multi-core processor. A processor 305 may be, or may include, one or more programmable general-purpose or special-purpose microprocessors, digital signal processors ("DSPs") programmable controllers, application specific integrated circuits ("ASICs"), programmable logic devices ("PLDs"), or the like, or a combination of such devices.

The interconnect system 315 illustrated in FIG. 3 is an abstraction that represents any one or more separate physical buses and/or point-to-point connections, connected by appropriate bridges, adapters and/or controllers. The interconnect system 315 may include, for example, a system bus, a form of Peripheral Component Interconnect (PCI) bus, a Hyper- Transport or industry standard architecture (ISA) bus, a small computer system interface (SCSI) bus, a universal serial bus (USB), an Institute of Electrical and Electronics Engineers (IEEE) standard 1394 bus (sometimes referred to as "Firewire"), and so on.

Memory 310 may include a system memory for storing programs and data while they are being used; a persistent storage device, such as a hard drive, for persistently storing programs and data; a computer-readable media drive, such as a CD-ROM or DVD-ROM drive, for reading programs and data stored on a computer-readable storage medium, or a combination of such memory devices. Memory 310 stores (among other things) the operating system 320 of the computing system 300. As used herein, memory 310 includes any form of volatile, nonvolatile, removable, and non-removable media, or any combination of such computer-readable media devices that are capable of storing information such as computer-readable instructions, data structures, program modules, and other data of the extensible content service 200.

In general, aspects of the invention may be stored or distributed on any tangible computer-readable storage media, including magnetically or optically readable computer discs, hard-wired or preprogrammed chips (e.g., EEPROM semiconductor chips), nanotechnology memory, biological memory, or other data storage media. Alternatively, computer-implemented instructions, data structures, screen displays, and other data under aspects of the invention may be distributed or conveyed over the Internet or over other data transmission networks (including wireless networks) on a propagated signal on a propagation medium (e.g., an electromagnetic wave, a sound wave, etc.) over a period of time, or they may be provided on any analog or digital network (packet switched, circuit switched, or other scheme).

Also connected to the processors 305 through the interconnect system 315 are one or more mass storage devices 325, a storage adapter 330, and a network adapter 335. Mass storage devices 325 may be, or include, any conventional medium for storing large volumes of data in a non-volatile manner, such as one or more magnetic or optical based disks. The storage adapter 330 is used by the computing system 300 to access the UCG storage subsystem 205 and may be, for example, a Fibre Channel adapter, a SCSI adapter, and/or the like. The network adapter 335 provides the computing system 300 with the ability to communicate with other computing systems, such as the systems used to implement authored content providers 210 and/or user computers 220, over a network and may be, for example, an Ethernet adapter, a Fibre Channel adapter, and/or the like.

While computing systems configured as described above are typically used to support the operation of the extensible content service 200, those skilled in the art will appreciate that the extensible content service 200 may be implemented using devices of various types and configurations, and having various components. For example, The computing system on which the extensible content service 200 is implemented includes one or more input devices, such as a keyboard, pointing device, microphone, etc., and/or one or more output devices, such as a display device, speakers, printer, etc., even though it is not illustrated as such in FIG. 3.

Figure 4:
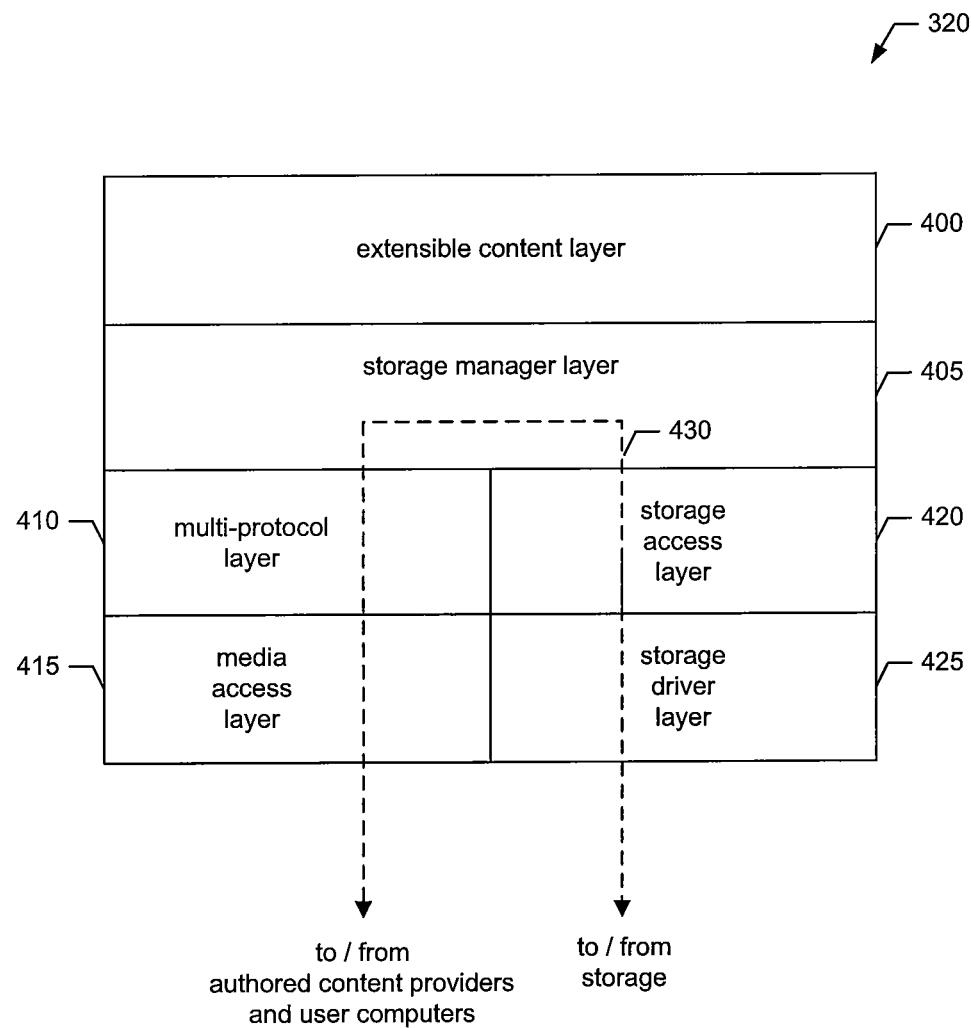
FIG. 4 is a high-level block diagram illustrating an example operating system of a computing system on which the extensible content layer.

FIG. 4 is a high-level block diagram illustrating an example operating system 320 of a computing system 300 on which an extensible content layer 400 executes in one or more embodiments. In the illustrated example, the operating system 320 includes several software layers, including a storage manager layer 405. The storage manager layer 405 is application-layer software that imposes a structure on the data stored by the computing system 300, such as user-generated content stored in the UGC storage subsystem 205. The storage manager layer 405 may be used to service requests received from authored content providers 210 and/or user computers 220. The operating system 320 may also include other application layers not illustrated.

Logically "under" the storage manager layer 405, the operating system 320 includes a multi-protocol layer 410 and an associated media access layer 415, to allow the computing system 300 to communicate over the network (e.g., with other computing systems used to implement the authored content providers 210 and/or user computers 220). The multi-protocol layer 410 implements various higher-level network protocols, such as Network File System (NFS), Common Internet File System (CIFS), Hypertext Transfer Protocol (HTTP), Transmission Control Protocol/Internet Protocol (TCP/IP), and/or the like. The media access layer 415 includes one or more drivers, which implement one or more lower-level protocols to communicate over the network, such as Ethernet, Fibre Channel, Internet small computer system interface (iSCSI), and/or the like.

Also logically "under" the storage manager layer 405, the operating system 320 includes a storage access layer 420 and an associated storage driver layer 425, to allow the computing system 300 to communicate with the UGC storage subsystem 205. The storage access layer 420 may implement a higher-level disk storage protocol, such as RAID, while the storage driver layer 425 implements a lower-level storage device access protocol, such as Fibre Channel Protocol (FCP), small computer system interface (SCSI), and/or the like. Also illustrated in FIG. 4 is the path 430 of data flow, through the operating system 320 associated with a request for user-generated content (e.g., such as the requests received from authored content providers 210 and/or user computers 220).

The operating system 320 also may include an extensible content layer 400 that is logically "above" of the storage manager layer 405. The extensible content layer 400 is an application layer that manages user-generated content contributed to an authored content provider 210. In yet another embodiment, the extensible content layer 400 is included in the storage manager layer 405. Note, however, that the extensible content layer 400 does not have to be implemented by the computing system 300. For example, the extensible content layer 400 is implemented in a separate system to which requests for user-generated content are provided as input. To facilitate description, it is assumed that the extensible content layer 400 manages user-generated content for multiple authored content providers 210.

Figure 5:
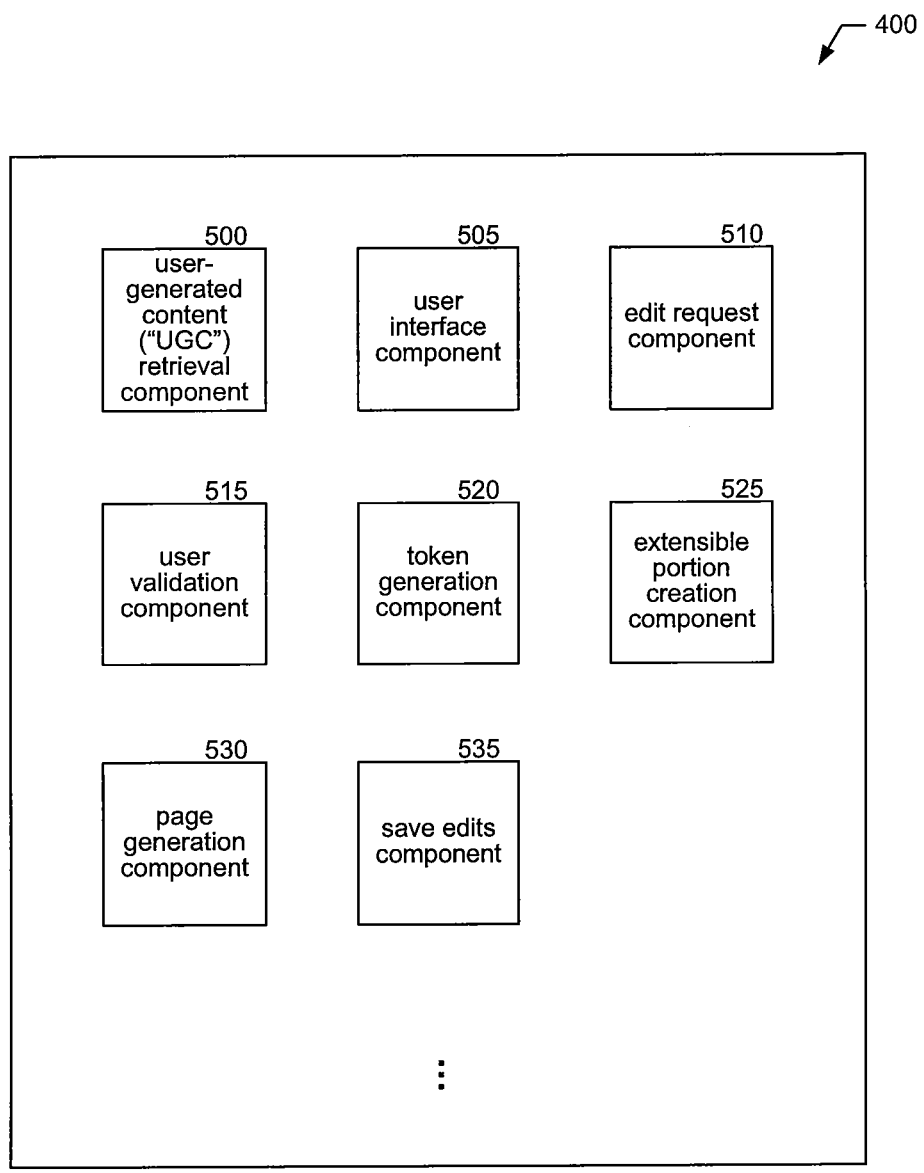
FIG. 5 is a high-level block diagram illustrating suitable components of an extensible content layer.

FIG. 5 is a high-level block diagram illustrating various components of an extensible content layer 400 in one or more embodiments. The components of the extensible content layer 400 can be distributed in various ways among multiple computing systems for performance, security, or other considerations. The extensible content layer 400 includes a user-generated content ("UGC") retrieval component 500, a user interface component 505, an edit request component 510, a user validation component 515, a token generation component 520, an extensible portion creation component 525, a page generation component 530, and a save edits component 535.

The UGC retrieval component 500 receives "retrieval" requests 230 from authored content providers 210 to retrieve user-generated content corresponding to a particular UGC identifier specified by the requests. In response to a retrieval request 230, the UGC retrieval component 500 provides the requesting authored content provider 210 with the user-generated content, if any, corresponding to the specified UGC identifier.

The user interface component 505 receive requests 230 from an authored content providers 210 to provide one or more client-side controls that the authored content providers may present to users to contribute content to the authored content providers 210. In response to a request from an authored content provider 210, the user interface component 505 returns the requested client-side controls to the requesting provider 210. The received client-side controls may be provided together with user-generated content and/or authored content to a user computer 220. In other embodiments, an authored content provider 210 may not provide the client-side controls to a user when the user has been authenticated by the provider 210. The user interface component 505 may also receive a request 235 from a user computer 220 to provide one or more interfaces that may be selected to contribute content to an authored content provider 210. In response to a request 235 from a user computer 220, the user interface component 505 may invoke the user validation component 515 to determine whether the requesting user has been authenticated and, if so, whether the user is authorized to receive the requested interface(s). If the received request 235 includes a valid token, and the user is authorized, the user interface component 505 returns the requested interface to the requesting user computer 220, such as a WYSIWYG editor. In some embodiments, the user interface component 505 includes a control to distribute or share one or more portions of the displayed user-generated content. In response to a request 235 from a user computer 220 to share a portion of user-generated content, the extensible content service generates or returns a reference to the requested content. For example, the user interface component 505 may return the UGC identifier of the content. In some embodiments, the user interface component 505 includes a control to add shareable user-generated to a web page of an authored content provider. For example, the user interface component 505 may include a control that, when selected by a user, presents an interface that allows the user to enter a UGC identifier of a sharable portion of user-generated content. In response to a request 235 from a user computer 220 to add user-generated content referenced by a particular UGC identifier, the user interface component 505 may invoke the user validation component 515 to determine whether the requesting user has been authenticated. If the received request 235 includes a valid token, the user interface component 505 adds the shareable user-generated content referenced by the UGC identifier to the page. As another example, the user interface component 505 may includes a control that, when selected by a user, presents an interface that allows the user to search for shareable user-generated content contributed to any of the subscribing authored content providers.

The edit request component 510 receives "edit" requests 235 from user computers 220 to edit user-generated content attributable to an authored content provider 210. In response to an edit request 235 from a user computer 220, the edit request component 510 may invoke the user validation component 515 to determine whether the requesting user has been authenticated by the authored content provider 210 and, if so, whether the user is authorized to edit the user-generated content. If the received edit request 235 includes a valid token, the edit request component 510 returns an editable version of the user-generated to the requesting user computer 220. The edit request component 510 may include a component to translate the user-generated content into a preferred editing format.

The user validation component 515 may be invoked by one or more components of the extensible content layer 400 and, in some embodiments, by an authored content provider 210. The user validation component 515 is invoked to determine whether a received request 235 includes a token and, if so, whether the token is valid. A token may be a key or data structure that is used to identify an authenticated user and/or a permission level associated with the user, such as editor, moderator, and so on. In some embodiments, a token is valid for a pre-determined or specified period of time. The user validation component 515 determines whether a token is valid, for example, by evaluating a timestamp associated with the token, by determining whether the token may be used to identify a user, and so on. The user validation component 515 may also be invoked to evaluate the permission level of an authenticated user and to determine whether the user is authored to perform desired action (e.g., create a user-generated page). Typically, no special permissions are required to view content. As a result, the user validation component 515 is generally not invoked by the UCG retrieval component 500.

The token generation component 520 receives "token" request 230 from authored content providers 210, each token request 230 indicating that a specified user has been authenticated by the provider, and requesting that the token generation component 520 generate a token corresponding to the authenticated user. In response to a token request, the token generation component 520 generates a corresponding "token" response 230 to return a generated token to the requesting authored content provider 210. The authored content provider 210 in the provider's corresponding "authentication" response 225 provides the generated token to the authenticated user.

The extensible portion creation component 525 receives "placeholder" requests 230 from authored content providers 210 to create a placeholder within an authored page (e.g., a portion of extensible content to which user-generated content may be contributed). In response to a placeholder request 230 from an authored content provider 210, the extensible portion creation component 525 creates a placeholder that is retrievable using a UGC identifier specified by the received placeholder request. The extensible portion creation component 525 may receive a "placeholder" request 235 from a user computer 220 to create a placeholder. For example, users may request to create a placeholder by selecting a client-side control. The extensible portion creation component 525 may invoke the user validation component 515 to determine whether the user has been authenticated and, if so, whether the user is authorized to create a placeholder. If the placeholder request 235 includes a valid token, and the user is authorized to a create placeholder, the extensible portion creation component 525 generates a placeholder. In some examples, the placeholder is not created (e.g., a UGC identifier is not stored) until user-generated content is contributed to the extensible portion represented by the placeholder.

The page generation component 530 receives "page-generation" requests 235 from user computers 220 to create user-generated pages attributable to an authored page (e.g., as new URLs in the same domain). User-generated pages are attributed to the authored content provider, thereby increasing the footprint of the authored content provider, reducing the costs associated with content generation, and increasing the search engine optimization of the provider.

In response to a page-creation request 235, the page generation component 530 may invoke the user validation component 515 to determine whether the user has been authenticated and, if so, whether the user is authored to add user-generated pages. If the page-creation request 235 includes a valid token, and the user is authorized to add user-generated pages, the page generation component 530 creates the requested user-generated page (e.g., using a shell page provided by the authored content provider 210). The page generation component 530 stores a reference to each user-generated page that is created by the component. User-generated pages may be automatically generated to include one or more extensible portions to which user-generated content may be contributed by users. The user-generated pages may include a particular layout, style, navigation, branding, advertisements, and/or other authored content specified by the authored content provider 210.

The save edits component 535 receives "save" requests 235 from user computers 220 to save edits made by the users to user-generated content. In response to a save request 235, the save edits component 535 may invoke the user validation component 515 to determine whether the user has been authenticated and, if so, whether the user is authored to save edits. If the save request 235 includes a valid token, and the user is authorized to save edits, the save edits component 535 saves the user edits. The save edits component 535 includes a component to copy the user edits to a recent version of the extensible content or to override a recent version by creating a new version corresponding to a previous version edited by the user. The save edits component 535 may include a version history component that may be used by an authored content provider 210 and or user computers 220 to review various versions of user-generated content attributed to the authored content provider 210. The revision history may include the scope of changes made to the user-generated content, such as deletions, additions, formatting changes, and so on.

Those skilled in the art will appreciate that the components shown in FIG. 5 may be altered in a variety of ways. For example, certain components may be merged or divided; certain shown components may be omitted; other components may be added; and so on.

Figure 6A:
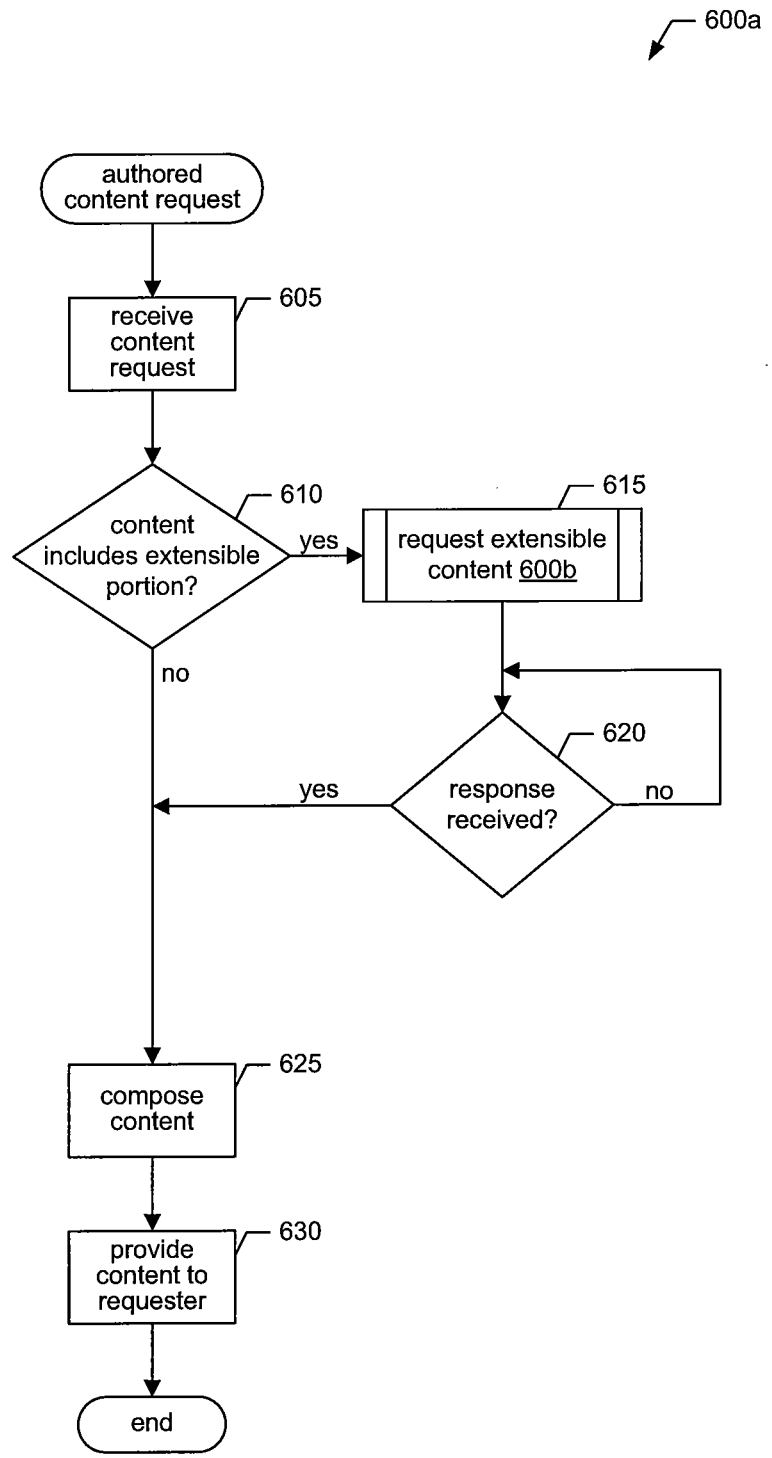
FIG. 6A is a flow diagram illustrating an example of a process performed in response to a request for content attributable to an authored content provider.

FIG. 6A is a flow diagram illustrating an example of a process 600a performed by the authored content provider 210 in response to a request for content attributable to an authored content provider 210. In step 605, an authored content provider 210 receives a "retrieval" request 225 for an authored page, then the authored content provider 210 continues to step 610. In step 610, if the requested content includes one or more portions of extensible content to which user-generated content may be, or has been, contributed, the authored content provider 210 continues to step 615. For example, if the authored content provider 210 has included one or more of the "social publishing" components provided by the extensible content service 200 on the requested page (e.g., by incorporating a client application within the authored page), then the authored content provider 210 continues to step 615. Otherwise, the authored content provider 210 continues to step 625.

In step 615, the authored content provider 210 generates a "retrieval" request 230 to the extensible content service 200 to retrieve the one or more portions of extensible content (using the UGC identifier and namespace corresponding to each portion of extensible content), then the authored content provider 210 continues to step 620. The authored content provider 210 may generate a separate retrieval request 230 for each extensible portion, while in other examples the requests may be grouped together (e.g., in a single retrieval request 230). In step 620, if a "retrieval" response 230 has been received from the extensible content service 200, the authored content provider 210 continues to step 625. Otherwise, the authored content provider 210 loops back to step 620. In step 625, the authored content provider 210 composes or builds the authored page, such that the authored content and one or more portions of extensible content are rendered together as a single page, then the authored content provider 210 continues to step 630. By rendering the authored and extensible content as a single page, the page is perceived by each requesting user computer 220 (e.g., search engine) as whole and fully attributable to the authored content provider 210. In step 630, the authored content provider 210 provides the requested page to the requesting user computer 220, then the process 600a ends.

Those skilled in the art will appreciate that the steps shown in FIG. 6A and in each of the following flow diagrams may be altered in a variety of ways. For example, the order of certain steps may be rearranged; certain steps may be performed in parallel; certain steps may be merged or divided; certain shown steps may be omitted; or other steps may be included; etc.

Figure 6B:
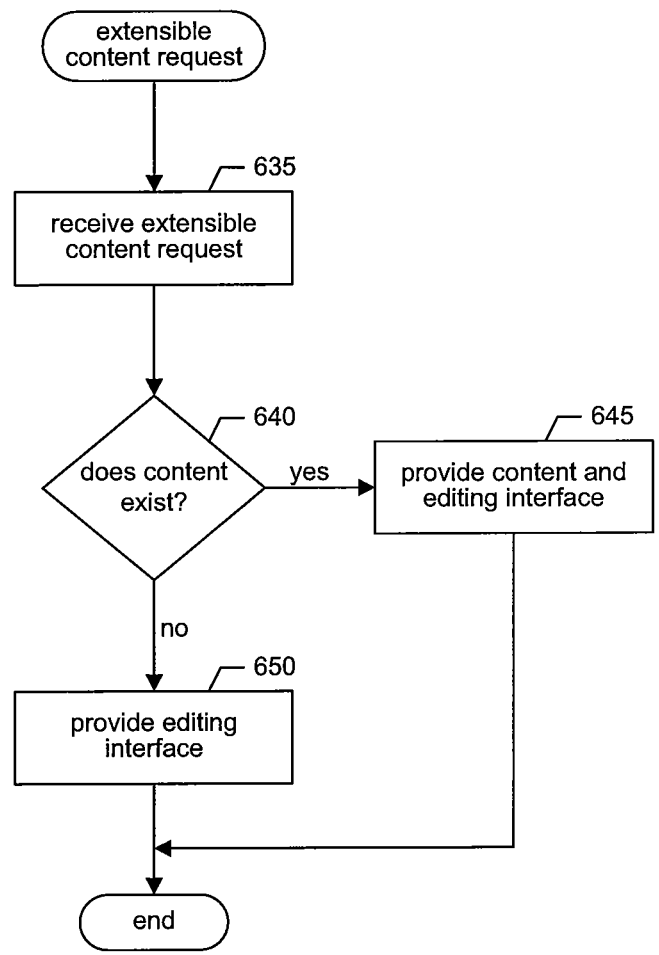
FIG. 6B is a flow diagram illustrating an example of a process performed in response to a request for extensible content attributable to an authored content provider.

FIG. 6B is a flow diagram illustrating a process performed in response to a request for extensible content attributable to an authored content provider 210 in one or more embodiments. The process 600b may be performed by an extensible content service 200 in response to a "retrieval" request 230 received from an authored content provider 210. In step 635, the extensible content service 200 receives a request for user-generated content, then the extensible content service 200 proceeds to step 640. In step 640, if the extensible content service 200 determines that the requested user-generated content exists (e.g., the extensible content service 200 identifies a UGC identifier and namespace matching the UGC identifier and namespace specified in the retrieval request 230), then the extensible content service 200 continues to step 645. In step 645, the extensible content service 200 retrieves the requested user-generated content and generates a corresponding "retrieval" response 230 to provide the user-generated content to the requester (e.g., authored content provider 210). Then the process ends. In some embodiments, such as the illustrated example, the extensible content service 200 includes in the response 230 an editing interface, such as one or more client-side controls, that may be used to request an editable version of the user-generated content. Otherwise, in step 640, if the extensible content service 200 determines that no content has been attributed to the specified UGC identifier and namespace, then the extensible content service 200 continues to step 650. In step 650, the extensible content service 200 generates a "retrieval" response 230 including an editing interface that may be used to contribute user-generated content by requesting an editable version of the user-generated content specified by the UGC identifier and namespace. Then the process 600b ends. In some embodiments, if the specified UGC identifier and namespace do not correspond to a portion of extensible content, then the extensible content service returns and error to the requester.

Figure 7A:
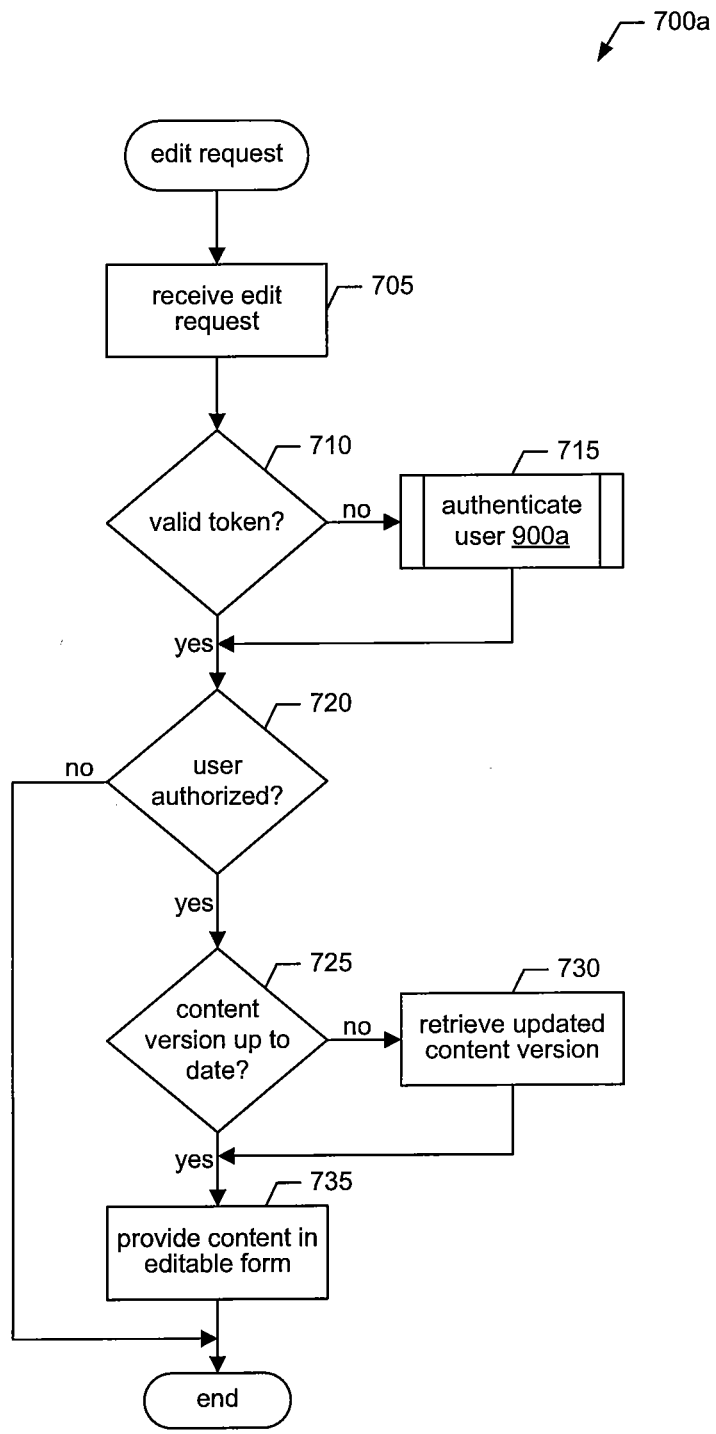
FIG. 7A is a flow diagram illustrating an example of a process performed in response to a request to edit extensible content.

FIG. 7A is a flow diagram illustrating a process performed in response to a request to edit user-generated content in one or more embodiments. The process 700b is performed by an extensible content service 200 in response to an "edit" request 235 received from a user computer 220. In step 705, the extensible content service 200 receives a request to edit user-generated content (e.g., having a UGC identifier and namespace matching the UGC identifier and namespace specified in the received request), then the extensible content service 200 continues to step 710. In step 710, if the extensible content service 200 determines that the received edit request 235 include a valid token, then the extensible content service 200 continues to step 720. Otherwise, if the received edit request 235 includes an invalid token (or no token), then the extensible content service 200 continues to step 715. In step 715, the extensible content service 200 authenticates the user, for example, by directing the user (e.g., via an API of the client application) to the authentication interface provided by the authored content provider 210. This may be accomplished in some embodiments, by invoking the process 900a described below in connection with FIG. 9A. Then the extensible content service 200 continues to step 720.

In step 720, if the extensible content service 200 determines that the user is authorized to edit the user-generated content, then the extensible content service 200 continues to step 725. Otherwise, the process 700a ends. In some embodiments, when a user is not authorized, the extensible content service 200 displays a message (e.g., via an API of the client application) indicating that the user is not authored to perform the requested action. The message may direct the user to an interface of the authored content provider 210 to submit an authorization request. In step 725, if the version of the user-generated content that was rendered is up-to-date, then the extensible content service 200 continues to step 735. Otherwise, the extensible content service 200 continues to step 730 to retrieve an updated version of the user-generated content, then the extensible content service 200 continues to step 735. In step 735, the content is provided to the user in an editable form. Then the process 700a ends. In some embodiments, when an updated version of the user-generated content is retrieved, the extensible content service 200 displays a message indicating that the user-generated content has been modified from the previously rendered version of the user-generated content. The extensible content service 200 may, in some embodiments, allow the user to select the up-to-date or previously rendered version of the user-generated content for editing (e.g., via an API of the client application).

Figure 7B:
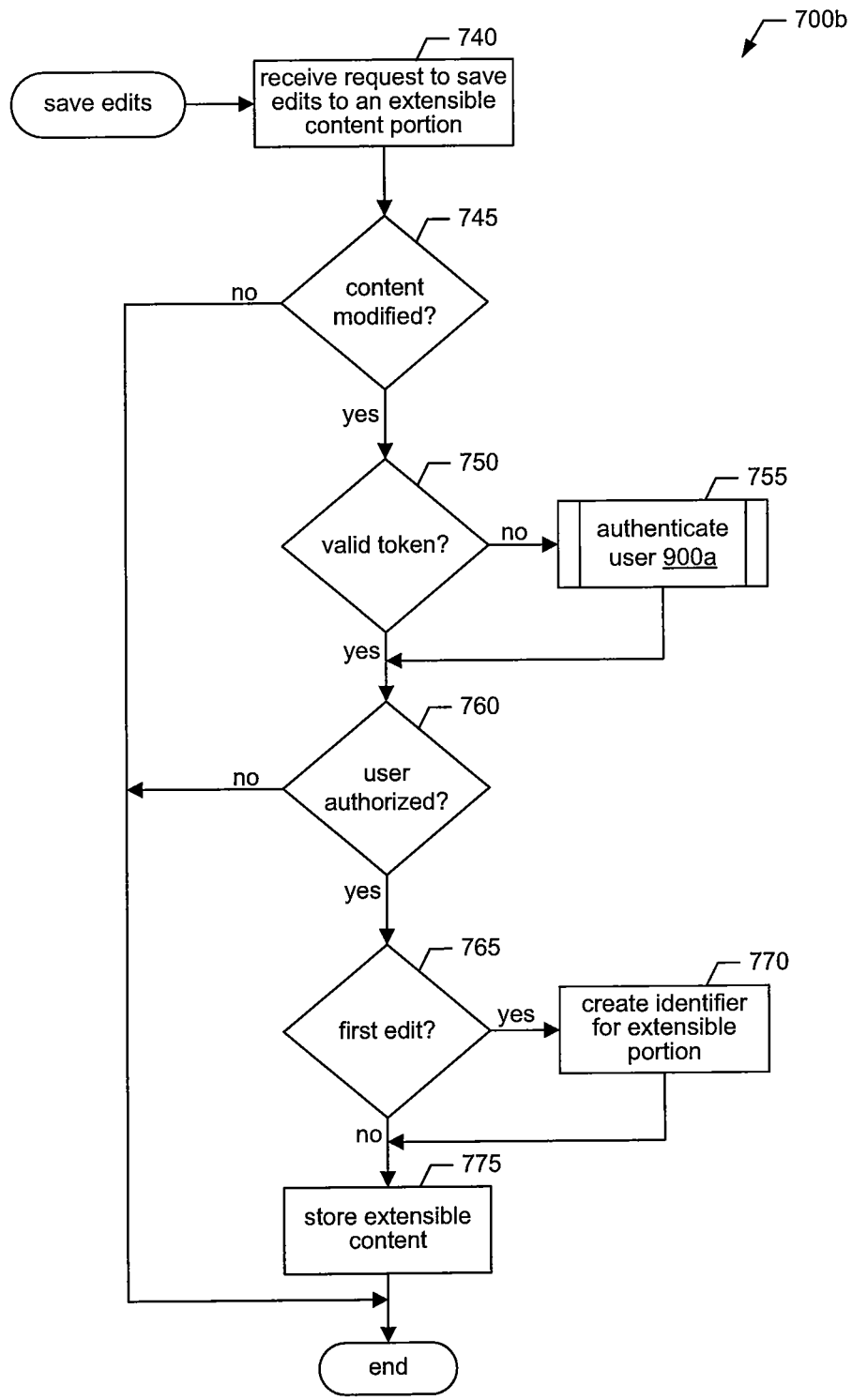
FIG. 7B is a flow diagram illustrating an example of a process performed in response to a request to save edits to extensible content.

FIG. 7B is a flow diagram illustrating a process performed in response to a request to save edits to extensible content in one or more embodiments. The process 700b is performed by an extensible content service 200 in response to a save request 235 received from a user computer 220. In step 740, the extensible content service 200 receives a save request 235 to save edits to at least one portion of extensible content, then the extensible content service 200 continues to step 745. In step 745, if the portion of extensible content has been modified (i.e., is different from the current, saved version), then extensible content service 200 continues to step 750. Otherwise the process 700b ends. That if, if the content has not been modified by the user, then it is not necessary to re-save the portion of extensible content. In step 750, if the extensible content service 200 determines that the received save request 235 includes a valid token, then the extensible content service 200 continues to step 760. Otherwise, if an invalid token (or no token) is provided, then the extensible content service 200 continues to step 755.

In step 755, the extensible content service 200 authenticates the user, for example, by directing the user to an authentication interface provided by the authored content provider 210 (e.g., via an API of the client application). This may be accomplished in some embodiments, by invoking the process 900a described below in connection with FIG. 9A. Then the extensible content service 200 continues to step 760. In step 760, if the user is authorized to save edits the portion of extensible content, then the extensible content service 200 continues to step 765. Otherwise, the process 700b ends. As discussed above in connection with FIG. 7A, in some embodiments, when a user is not authorized, the extensible content service 200 may display a message indicating to the user that the user is not authored to perform the requested action. The message may direct the user to an interface of the authored content provider 210 to submit an authorization request. In step 765, if the edits to be saved correspond to the first edit (i.e., the portion of extensible content previously included no content), then the extensible content service 200 continues to step 770. Otherwise, the extensible content service 200 continues to step 775. In step 770, the extensible content service 200 generates an identifier for the portion of extensible content, and then continues to step 775. In step 775, the extensible content service 200 updates portion of extensible content (e.g., by creating a new version that includes the user's edits) and stores updated portion of extensible content, thereby preparing the portion of extensible content for viewing (e.g., in response to a request from that user computer 220 or another user computer 220).

Figure 8:
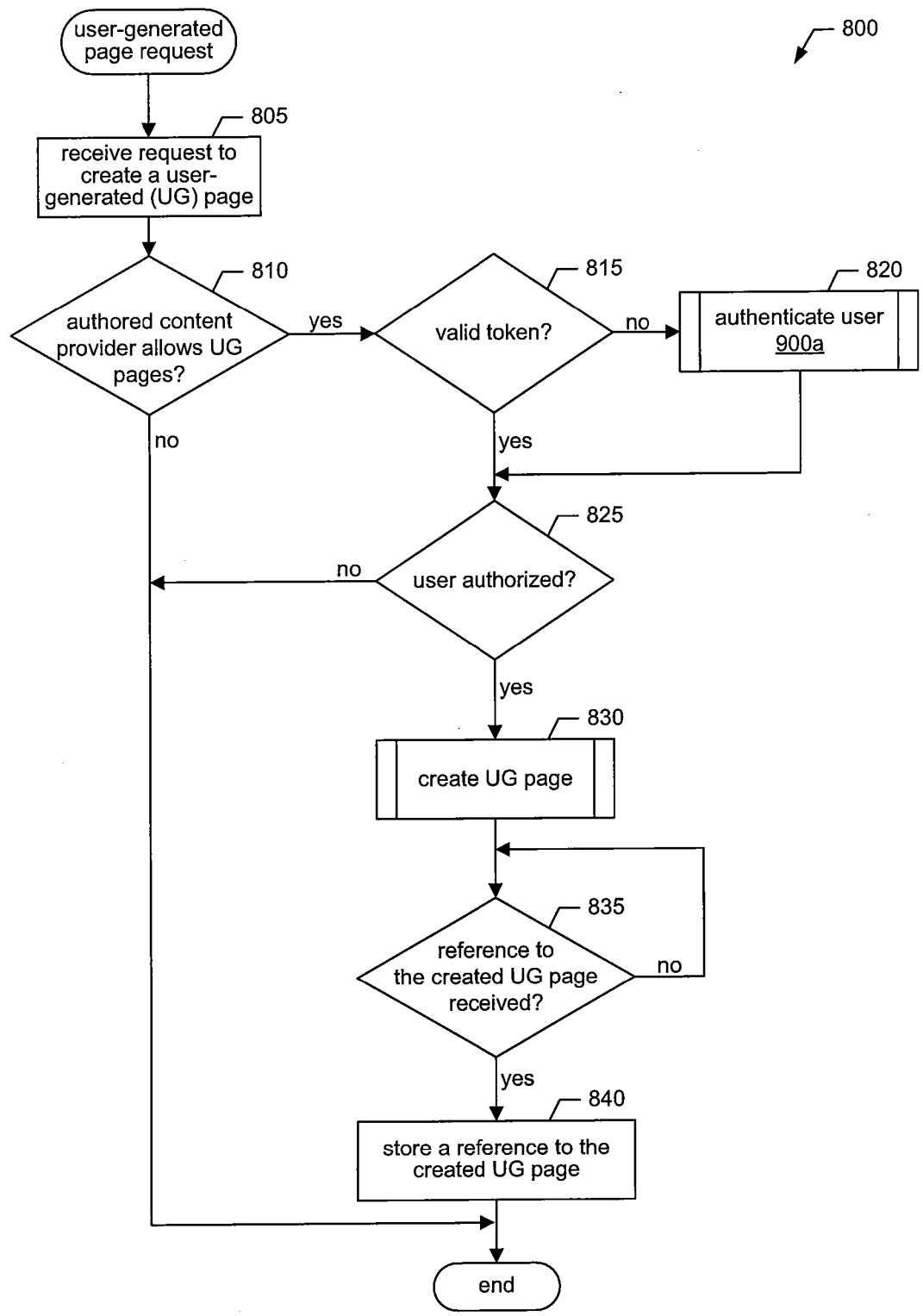
FIG. 8 is a flow diagram illustrating an example of a process performed in response to a request to create a user-generated page.

FIG. 8 is a flow diagram illustrating a process performed in response to a request to create a user-generated page in one or more embodiments. The process 800 is performed by an extensible content service 200 in response to a page-generation request 235 received from a user computer 220. In step 805, an extensible content service 200 receives a page-generation request 235 from a user computer 220 to create a user-generated page attributed to an authored content provider 210, then the extensible content service 200 continues to step 810. In step 810, if the authored content provider 210 permits users to add user-generated page, then the extensible content service 200 continues to step 815. Otherwise, the process 800 ends. In step 815, if the extensible content service 200 determines that the received page-generation request 235 includes a valid token, then the extensible content service 200 continues to step 825. Otherwise, if an invalid token (or no token) is provided, then the extensible content service 200 continues to step 820. In step 820, the extensible content service 200 authenticates the user, for example, by directing the user to an authentication interface provided by the authored content provider 210 (e.g., via an API of the client application). This may be accomplished in some embodiments, by invoking the process 900a described below in connection with FIG. 9A. Then the extensible content service 200 continues to step 825.

In step 825, if the user is authorized to add a user-generated page, then the extensible content service 200 continues to step 830. Otherwise, the process 800 ends. As discussed above in connection with FIGS. 7A and 7B, in some embodiments, when a user is not authorized, the extensible content service 200 may display a message indicating that the user is not authored to perform the requested action. The message may direct the user to an interface of the authored content provider 210 to submit an authorization request. In step 830, a process to create a user-generated page is invoked, then the extensible content service 200 continues to step 835. The extensible content provider 200 may generate a URL for the created page. As one example, the extensible content provider 200 may append the new UGC identifier of the page to the URL of the parent page. In step 835, if a reference to the created page is, or has been, received by the extensible content service 200, then the extensible content service 200 continues to step 840. Otherwise, the extensible content service 200 loops back to step 835. In step 840, the extensible content service 200 stores the received reference to the created page, then the process 800 ends.

Figure 9A:
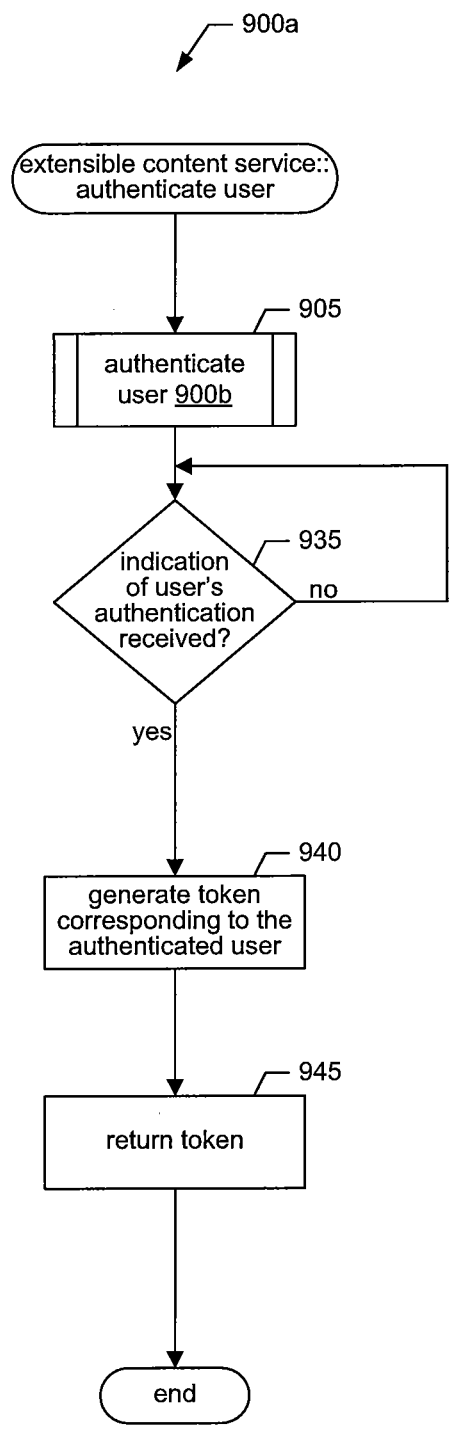
FIGS. 9A and 9B are flow diagrams illustrating example processes performed to authenticate a user.
Figure 9B:
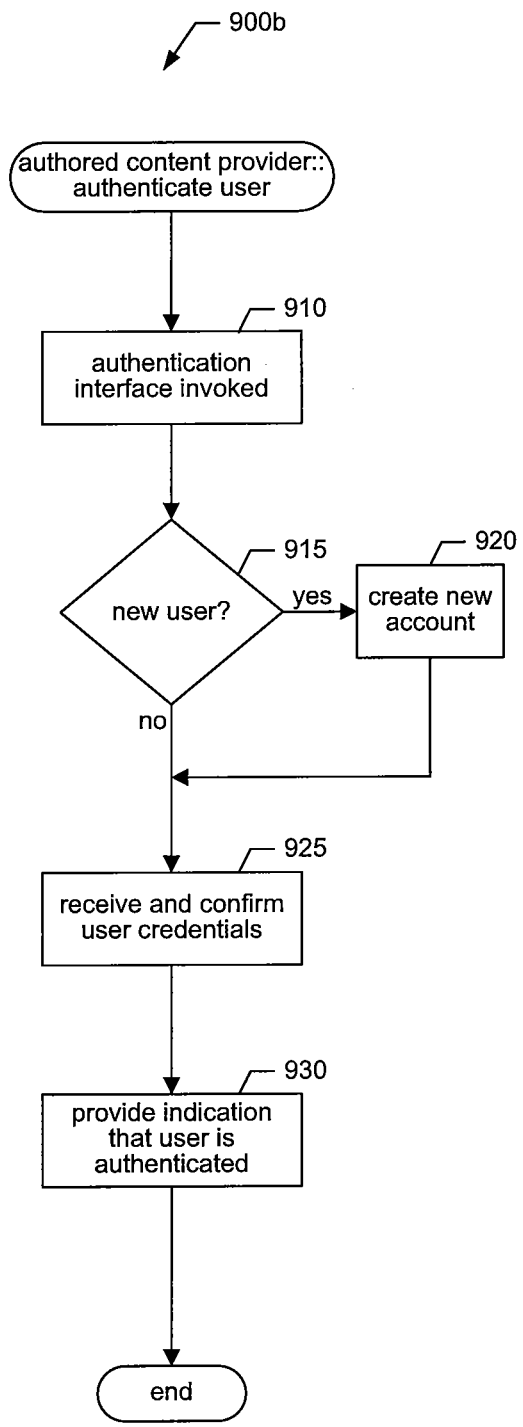

FIGS. 9A and 9B are flow diagrams illustrating processes performed to authenticate a user in one or more embodiments. The process 900a may be performed by an extensible content service 200 to determine whether a request 235 has been received from an authenticated user computer 220. The process 900b may be invoked by the extensible content service 200 (e.g., via an API provided by the client application) to authenticate a user through an authentication interface provided by an authored content provider 210. Alternatively or additionally, the process 900b is invoked without being any direction from an extensible content service 200.

In step 905, an extensible content service 200 invokes the process 900b to authenticate the user, then the extensible content service 200 continues to step 935. In step 935, if an indication is, or has been, received indicating that the user was authenticated by the authored content provider 210, then the extensible content service 200 continues to step 940. Otherwise, the extensible content service 200 loops back to step 935. In step 940, the extensible content service 200 generates a token corresponding to the authenticated user, and the extensible content service 200 continues to step 945. In step 945, the extensible content service 200 returns the token, and the process 900a ends. For example, the token may be provided to the authored content provider 210, which in turn provides the token to the user computer 220 of the authenticated user. A generated token may be a key or data structure that is used to identify the authenticated user and/or a permission level associated with the user, such as editor, moderator, and so on. The token may then be included with requests generated by the authenticated user computer 220 to access the social publishing features of the extensible content service 200, including, for example, those features illustrated in FIGS. 7A and 7B, and FIG. 8.

Returning to FIG. 9B, in step 910, an authentication (e.g., "sign-on") interface of the authored content provider 210 is invoked (e.g., via an API of the client application), and the authored content provider 210 continues to step 915. For example, the authored content provider's interface may be invoked when the extensible content service 200 directs the user to sign-on to the authored content provider 210, such as in step 905 of process 900a. As another example, an authored content provider's authentication interface may be invoked by the user navigating to the authentication interface without any direction from an extensible content service 200. In step 915, if the user is a new user (e.g., has not previously registered or subscribed to the authored content provider 210), then the authored content provider 210 continues to step 920. Otherwise, the authored content provider 210 continues to step 925. In step 920, the authored content provider 210 provides an interface for the user to register (e.g., create an account), and the authored content provider 210 continues to step 925. In step 925, the authored content provider 210 receives and confirms the user's credentials (e.g., username, email address, password, pin, or the like, or a combination one or more credentials), and then continues to step 930. Details regarding user authentication are known and well documented, and thus need not be described in detail in order to gain an understanding of the concepts and operation of the technology introduced herein. In step 930, the authored content provider 210 provides a notification or a request 230 to an extensible content service 200 indicating that the user was authenticated by the authored content provider 210, after which the process 900b ends.

Figure 10:
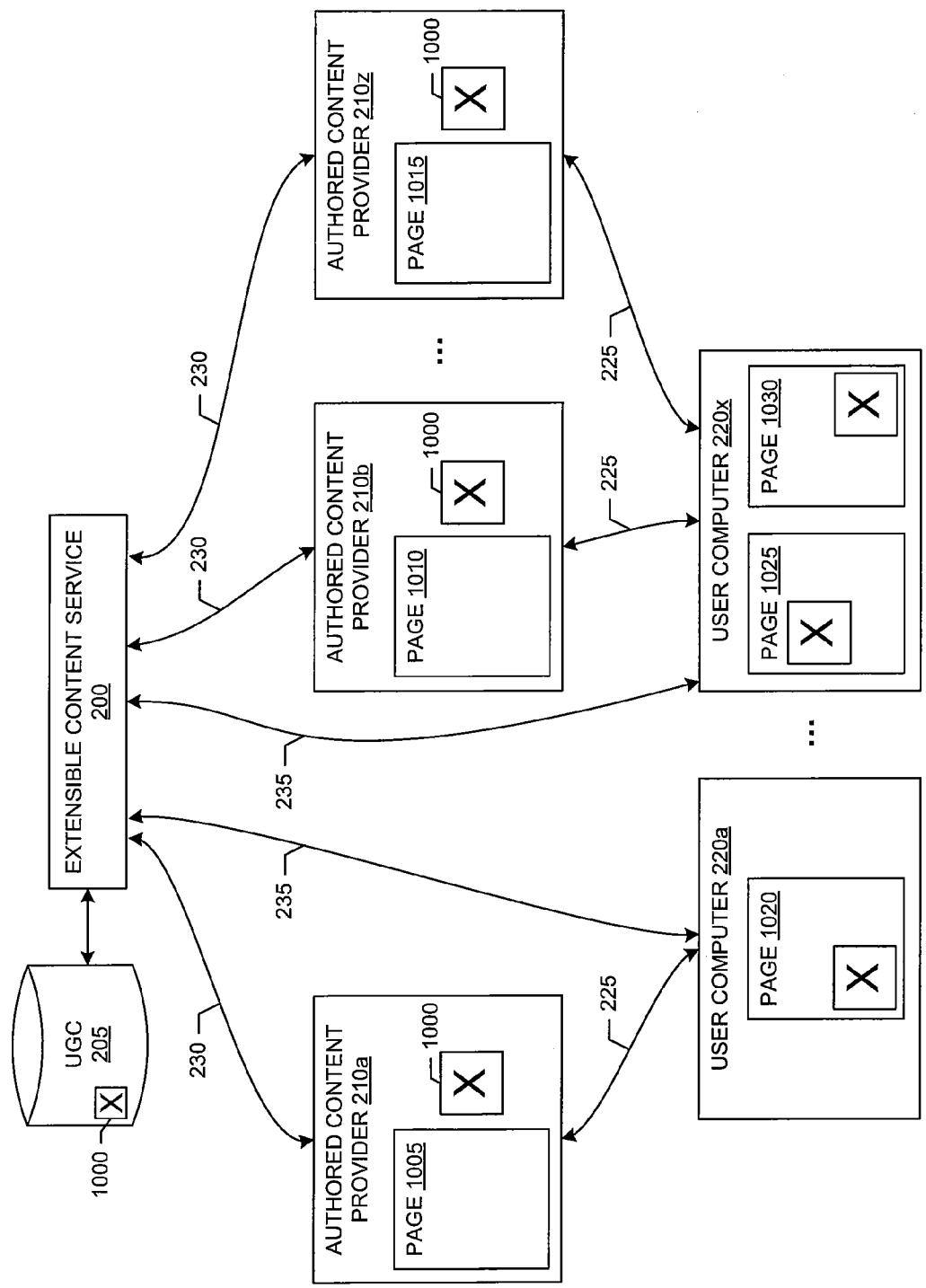
FIG. 10 is a high-level block diagram illustrating an example of an extensible content service for hyper-distribution of user-generated content that attributable to multiple authored content providers.

In some embodiments, the extensible content service enables user-generated content to be shared between two or more authored content providers. FIG. 10 is a high-level block diagram illustrating an example of an extensible content service 200 for hyper-distribution of user-generated content that attributable to multiple authored content providers 210. In the illustrated example, each authored content providers 210 receives a "retrieval" request 225 from a user computer 220 for an authored page that includes to shared user-generated content 1000. For example, authored content provider 210a receives a "retrieval" request 225 from user computer 220a for authored page 1005; authored content providers 210b receives a "retrieval" request 225 from user computer 220x for authored page 1010; and authored content provider 210z receives a "retrieval" request 225 from user computer 220x for authored page 1015. In response to the retrieval requests 225, each authored content provider 210 generates a "retrieval" request 230 to retrieve the shared user-generated content 1000 from the extensible content service 200. In response to the retrieval request, the extensible content service 200 retrieves the shared user-generated content 1000 and generates a corresponding "retrieval" response 230 that provides the shared user-generated content 1000 to each of the authored content providers 210. Each authored content provider 210 then generates a "retrieval" response 225 that renders the authored content page together with the shared user-generated content 1000 in a viewable state. For example, authored content provider 210a generates a "retrieval" response 225 that renders authored content page 1005 together with the shared user-generated content 1000 in a single page 1020; authored content provider 210b generates a "retrieval" response 225 that renders authored content page 1010 together with the shared user-generated content 1000 in a single page 1025; and authored content provider 210z generates a "retrieval" response 225 that renders authored content page 1015 together with the shared user-generated content 1000 in a single page 1030. In the SEO context, the pages 1020-1030 are perceived by each requesting user computer 220 as whole and attributable to the authored content providers 210.

Figure 11:
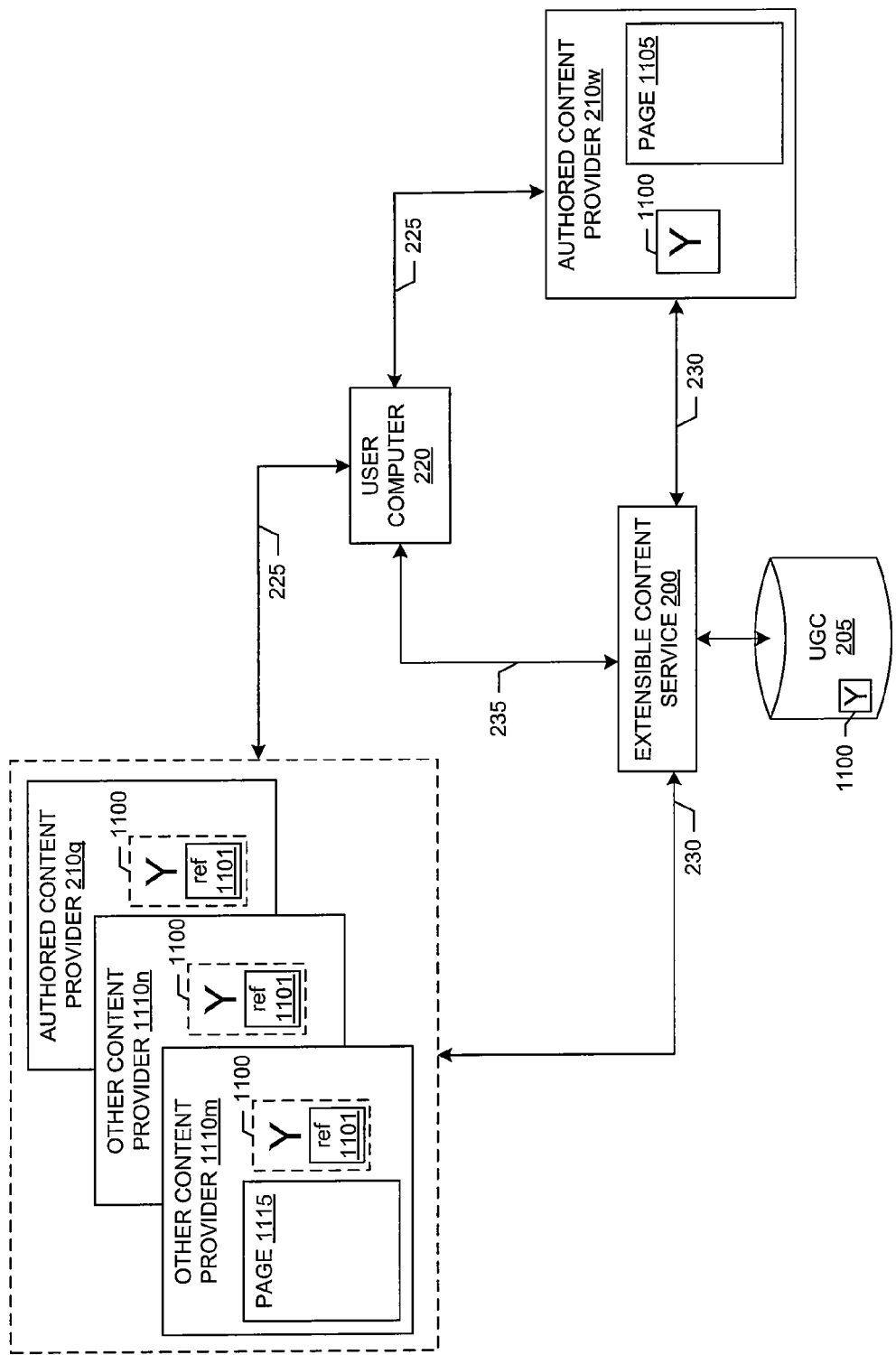
FIG. 11 is a high-level block diagram illustrating an example of an extensible content service for hyper-distribution of user-generated content that identifies the authored content provider to which the user-generated content was originally contributed.

In some embodiments, the extensible content service 200 allows an authored content provider 210 to specify whether its originally-contributed user-generated content may be shared and on what basis. For example, an authored content provider 210 may specify that particular portions of user-generated content on a page that are shareable. In some embodiments, an authored content provider 210 may further specify whether its shared user-generated content, if any, may be attributed to other authored content providers 210. FIG. 11 is a high-level block diagram illustrating an example of an extensible content service for hyper-distribution of user-generated content that identifies the authored content provider to which the user-generated content was originally contributed. To facilitate description in the illustrated example, it is assumed that user-generated content 1100 is shareable and was originally contributed to authored content provider 210w within an editable portion of page 1105. In the illustrated example, when authored content provider 210w receives a "retrieval" request 225 from a user computer 220 for authored page 1105, it generates a "retrieval" response 225 that renders the authored content page 1105 together with the shared user-generated content 1100 in a single page as described in connection with FIG. 10. However, when the shared user-generated content 1100 is presented to a user computer 220 by a content provider other than authored content provider 210w, the shared content 1100 includes a reference 1101 to authored content provider 210w. To facilitate description in the illustrated example, it is further assumed that user-generated content 1100 is shared by authored content provider 210q and other content providers 1110m . . . 1110n. When authored content provider 210q or other content providers 1110m . . . 1110n receives a "retrieval" request 225 from a user computer 220 for a page that includes shared user-generated content 1100, the content provider generates a "retrieval" response 225 that renders requested page with a reference to the extensible content service 200 and a location within the UGC storage subsystem 205 at which the shared user-generated content 1110 may be retrieved (e.g., the UGC identifier). For example, the source code of the response page may include an iframe identifying the extensible content service 200 and UGC identifier of the shared content 1100. In the illustrated embodiment, the shared user-generated content 1100 is provided together with a reference 1101 to the authored content provider 210w to which the content was originally contributed. For example, the reference 1101 may be a link to the page 1105 at which the user-generated content 1100 was originally contributed to authored content provider 210. By including a link back to the originating authored content provider 210w, the extensible content service 200 increases the likelihood that such user-generated content 1100 will be discovered, crawled, and indexed by search engines without sacrificing its uniqueness.

Overall, an extensible content service for optimizing content attributable to an authored content provider, including user-generated content, has been described. The extensible content service described herein significantly reduces an authored content provider's costs to generate content and achieve SEO credit from such content.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. In addition, while processes or blocks are at times shown as being performed in series, these processes or blocks may instead be performed in parallel, or may be performed at different times.

The teachings of the invention provided herein can be applied to other systems, not necessarily the system described above. The elements and acts of the various examples described above can be combined to provide further implementations of the invention. Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

While certain aspects of the invention are presented below in certain claim forms, the applicant contemplates the various aspects of the invention in any number of claim forms. For example, while only one aspect of the invention is recited as a means-plus-function claim under 35 U.S.C sec. 112, sixth paragraph, other aspects may likewise be embodied as a means-plus-function claim, or in other forms, such as being embodied in a computer-readable medium. (Any claims intended to be treated under 35 U.S.C. §112, ¶6 will begin with the words "means for", but use of the term "for" in any other context is not intended to invoke treatment under 35 U.S.C. §112, ¶6.) Accordingly, the applicant reserves the right to add additional claims after filing the application to pursue such additional claim forms for other aspects of the invention.

We claim:

1. A method in a computer system to authorize a user at a user computer to edit or add content to, at least a user-editable portion of an extensible web page, wherein the extensible web page is served by a web server, but the user-editable portion is served by a user-content hosting server, the method comprising:

at the user-content hosting server, determining if a valid token associated with the user has been provided, wherein the user-content hosting server generates valid tokens for users who supply authorized credentials to the web server;

wherein the user-content hosting server generates tokens based on requests to edit, or add content to, the user-editable portion of the extensible web page, wherein the request is received from the user computer, wherein the extensible web page is served by the web server, but the user-editable portion is served by the user-content hosting server, wherein the web server is different from, and geographically separated from, the user-content hosting server, and wherein the web server is controlled or operated by a commercial entity different from the user-content hosting server;

if a valid token associated with the user has been provided, then receiving and storing at the user-content hosting server edits to, or content added to, the user-editable portion of the extensible web page; and, if a valid token associated with the user has not been provided, then directing the user to be authenticated to the web server before storing at the user-content hosting server edits to, or content added to, the user-editable portion of the extensible web page.

2. The method of claim 1 wherein the web server is behind a firewall controlled by a business entity, wherein the editable web page includes content editable by trained users associated with the business entity, wherein the trained users have access to the web server behind the firewall, wherein the editable portion is configured to permit untrained users outside the firewall to edit the extensible web page, and wherein the untrained users are unaffiliated with the business entity.

3. The method of claim 1 wherein receiving from the user computer a request to edit, or add content to, the portion of the extensible web page does not include information identifying the user and information identifying the user does not pass to the user-content hosting server.

4. The method of claim 1 wherein the token is valid for a time period of less than 24 hours.

5. The method of claim 1 wherein the token defines rights for specific users, and wherein the rights include moderator rights and editor rights.

6. The method of claim 1 wherein the web server hosts first and second differing web sites, and wherein a valid token associated with the user to edit a user-editable portion of an extensible web page for the first web site does not permit the user to edit a user-editable portion of an extensible web page for the second web site.

7. A user content hosting server computer system configured to serve user-editable portions of an extensible web page and to authorize a user at a user computer to edit or add content to, at least a user-editable portion of an extensible web page that is served by a web server, comprising:
    a processor configured to:
        generate valid tokens for users who supply authorized credentials to the web server based on requests from a user computer to edit, or add content to, the user-editable portion of the extensible web page that is served by the web server that is different from, and geographically separated from, the user-content hosting server and is controlled or operated by a commercial entity different from the user-content hosting server;
        determine if a valid token associated with the user has been provided;
        if a valid token associated with the user has been provided, then receive and store at the user-content hosting server edits to, or content added to, the user-editable portion of the extensible web page; and
        if a valid token associated with the user has not been provided, then direct the user to be authenticated to the web server before storing at the user-content hosting server edits to, or content added to, the user-editable portion of the extensible web page.

* * * * *